United States Patent
Kwon et al.

(10) Patent No.: US 9,730,257 B2
(45) Date of Patent: Aug. 8, 2017

(54) METHOD AND APPARATUS FOR ESTABLISHING DEVICE-TO-DEVICE CONNECTION IN WIRELESS COMMUNICATION SYSTEM

(71) Applicant: LG ELECTRONICS INC., Seoul (KR)

(72) Inventors: Younghwan Kwon, Seoul (KR); Jangwoong Park, Seoul (KR); Seungryul Yang, Seoul (KR); Dongtaek Lee, Seoul (KR); Jaeho Lee, Seoul (KR); Hyeonjae Lee, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/035,192

(22) PCT Filed: Nov. 5, 2014

(86) PCT No.: PCT/KR2014/010592
§ 371 (c)(1),
(2) Date: May 6, 2016

(87) PCT Pub. No.: WO2015/069024
PCT Pub. Date: May 14, 2015

(65) Prior Publication Data
US 2016/0278151 A1 Sep. 22, 2016

Related U.S. Application Data

(60) Provisional application No. 61/900,966, filed on Nov. 6, 2013, provisional application No. 61/910,409, filed on Dec. 1, 2013.

(51) Int. Cl.
*H04W 76/02* (2009.01)
*G08C 23/04* (2006.01)
(Continued)

(52) U.S. Cl.
CPC ......... *H04W 76/023* (2013.01); *G08C 23/04* (2013.01); *H04W 4/008* (2013.01); *G08C 17/02* (2013.01)

(58) Field of Classification Search
CPC .................................................. H04W 76/023
See application file for complete search history.

(56) References Cited

U.S. PATENT DOCUMENTS 8,170,722 B1 * 5/2012 Elberbaum ........... H04L 12/281
455/151.1

FOREIGN PATENT DOCUMENTS

KR 10-2010-0086570 8/2010
KR 20100086570 * 8/2010 ............... H04Q 9/04
(Continued)

OTHER PUBLICATIONS

PCT International Application No. PCT/KR2014/010592, Notification of Transmittal of the International Search Report dated Feb. 11, 2015, 3 pages.

*Primary Examiner* — Tuan H Nguyen
(74) *Attorney, Agent, or Firm* — Lee, Hong, Degerman, Kang & Waimey

(57) ABSTRACT

The present specification relates to a method for establishing, by a first device, a device-to-device connection in a wireless communication system, the method comprising the steps of: transmitting, to at least one second device, a first communication signal including connection information for a second communication connection; receiving a response to an infrared signal from the at least one second device; and establishing a second communication connection with the second device on the basis of the received response.

16 Claims, 22 Drawing Sheets

(51) Int. Cl.
*H04W 4/00* (2009.01)
*G08C 17/02* (2006.01)

(56) References Cited

FOREIGN PATENT DOCUMENTS

| | | |
|---|---|---|
| KR | 10-1076975 | 10/2011 |
| KR | 10-2013-0039135 | 4/2013 |
| KR | 10-2013-0110411 | 10/2013 |
| WO | 2012/099370 | 7/2012 |

* cited by examiner

Figure 5
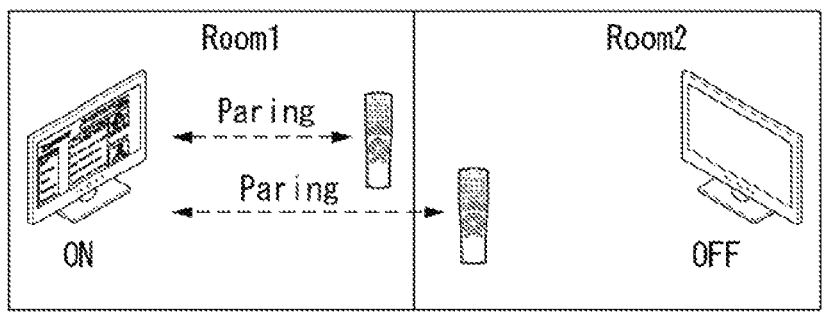
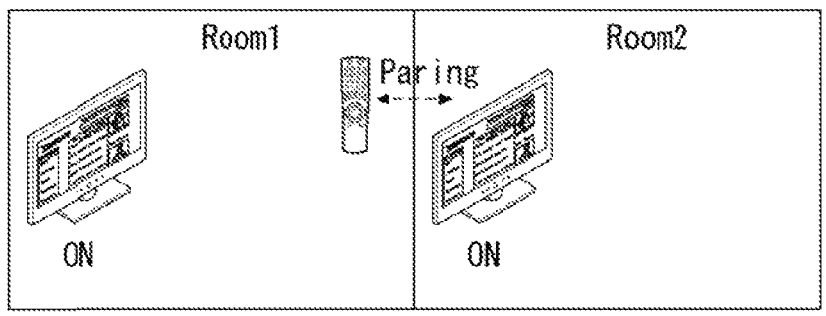
Figure 6a
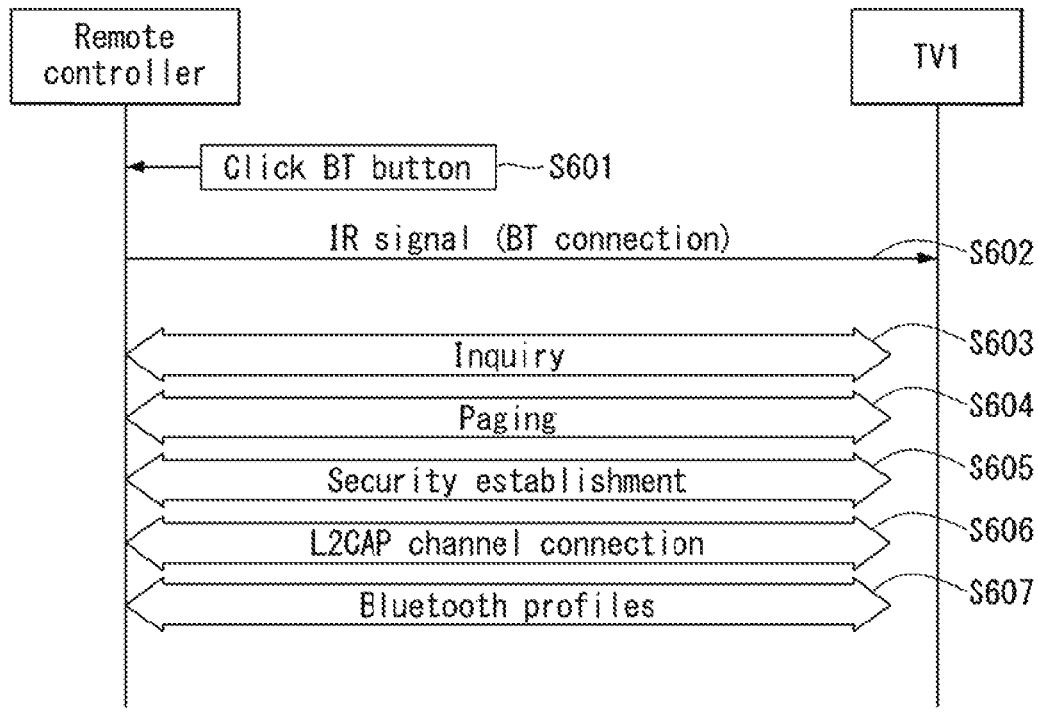

METHOD AND APPARATUS FOR ESTABLISHING DEVICE-TO-DEVICE CONNECTION IN WIRELESS COMMUNICATION SYSTEM

CROSS-REFERENCE TO RELATED APPLICATIONS

This application is the National Stage filing under 35 U.S.C. 371 of International Application No. PCT/KR2014/010592, filed on Nov. 5, 2014, which claims the benefit of U.S. Provisional Application No. 61/900,966, filed on Nov. 6, 2013 and U.S. Provisional Application No. 61/910,409, filed on Dec. 1, 2013, the contents of which are all incorporated by reference herein in their entirety.

TECHNICAL FIELD

This specification relates to a method and apparatus for performing a device-to-device connection, i.e., pairing in a wireless communication system.

BACKGROUND ART

Nowadays, use of Bluetooth has been generalized. Bluetooth may penetrate solid and nonmetallic material to transmit a signal. A transmitting range thereof is 10 cm to 10 m, but may be extended to 100 m when increasing transmission power. Bluetooth is established based on a low cost and a short range wireless link and facilitates an ad hoc connection in a fixed and mobile communication environment.

Bluetooth uses 2.45 GHz frequency, which is the same Industrial, Scientific, and Medical (ISM) band as that of 802.11b/g, which is a wireless local area network (LAN) specification, and Bluetooth devices may perform wireless communication through a search/selection/authentication (pairing) process of a peripheral Bluetooth device.

Further, Bluetooth may exhibit a relatively fast speed with relatively low power and low cost, but because a transmitting distance thereof is limited to maximum 100 m, Bluetooth is appropriate to use at limited space.

Bluetooth is one of representative short range wireless technologies that connect various devices (smart phone, personal computer (PC), earphone, and headphone) to give and receive information. Bluetooth is applied to recent most smart phones, PCs, and notebook computers, and thus a device-to-device pairing procedure may be quickly performed and Bluetooth may stably provide device-to-device connectivity.

Due to such merits of Bluetooth, in order to control a smart TV, Bluetooth is applied to a remote control to be widely used.

However, a Bluetooth type remote control has a problem due to a wireless connection unlike an existing Infra-red (IR) Line-of-Sight method.

That is, in an environment in which a plurality of TVs exist, connectivity with an existing TV is continuously maintained and connectivity with a new TV is not secured.

Recently, a magic remote control solves the problem through a pairing initialization process, but for the pairing initialization process, because a complex procedure such as a new pairing request is required, there is inconvenience in use the Bluetooth type remote control.

DISCLOSURE

Technical Problem

This specification provides a method of performing a Bluetooth connection by providing Bluetooth connection information through an InfraRed (IR) signal.

Further, this specification provides a method of setting control authority of a plurality of devices.

Further, this specification provides a method of performing a Bluetooth connection with a specific device by providing information about Bluetooth connectable devices.

Further, this specification provides a method in which a plurality of remote controllers give and receive control authority of a specific device.

The technical problem of this specification is not limited to the above-described technical problems and the other technical problems will be understood by those skilled in the art from the following description.

Technical Solution

In accordance with an aspect of this specification, a method of performing a device-to-device connection in a wireless communication system, the method performed by a first device includes: transmitting a first communication signal including connection information for a second communication connection to at least one second device; receiving a response to the first communication signal from the at least one second device; and performing a second communication connection with the second device based on the received response, wherein the connection information includes at least one of version information representing a second communication version of the first device, type information representing a second communication technology type supported by the first device, address information representing a second communication connection address of the first device, and synchronization information used for synchronization of a second communication connection.

The method may further include transmitting a first message including control information related to control authority setup of a plurality of remote controllers to the second device.

The control information may include at least one of a multi control type field representing a control type of a plurality of remote controllers, a controller address field representing a second communication connection address of a remote controller that can control a pairing device, a controller number field designating the number of remote controllers in which pairing is available, and a main controller field representing a main remote controller that can control a pairing device.

The multi control type field may include at least one of a first type representing a method of acquiring control authority through contention, a second type representing a method of acquiring control authority according to a priority, a third type representing a method in which only one remote controller has control authority, and a fourth type representing a method in which a plurality of remote controllers share control authority.

The method may further include: transmitting a control authority request message for requesting control authority related to remote control to the second device; and receiving a response to the control authority request message from the second device.

The performing of a second communication connection may include: outputting a list of at least one second device in which a second communication connection is available based on the response; receiving a selection input to a specific second device in the output list; and performing a second communication connection with the selected second device.

The method may further include: transmitting a control authority return message for returning control authority related to remote control to the second device; and receiving a response to the control authority return message from the second device, wherein the response to the control authority return message is confirmation or rejection of control authority return.

The method may further include receiving a control authority release message notifying that control authority related to remote control is released from the second device.

The first communication signal may be an IR code allocated on each device basis, and the IR code may have a size of 1 to 2 byte.

The first device may include at least one of a first button for transmitting a second communication connection request signal, a second button for searching for devices in which second communication connection is available, and a display unit for displaying a name of a device selected by the second button.

The synchronization information may include at least one of frequency hopping sequence information and native clock information representing time offset of a reference clock.

The method may further include: performing Audio/Video (A/V) setup with the second device; and receiving A/V stream from the second device.

The response may be a connection request message, and the response may include second communication connection information related to the second device.

The performing of a second communication connection may include: transmitting an inquiry message to the at least one second device; and receiving an Extended Inquiry Response (EIR) message corresponding to a response to the inquiry message from the at least one second device.

The method may further include performing a paging procedure with the second device.

The first device may be a remote controller, and the second device may be a Television (TV).

In accordance with another aspect of this specification, a first device that performs a device-to-device connection in a wireless communication system, the first device includes: a communication unit that transmits and receives a signal to and from the outside by wire and/or wireless; and a controller functionally connected to the communication unit, wherein the controller transmits a first communication signal including second communication connection information to at least one second device; receives a response to the first communication signal from the at least one second device; and controls to perform a second communication connection with the second device based on the received response, wherein the second communication connection information includes at least one of version information representing a second communication version of the first device, type information representing a first communication technology type supported by the first device, address information representing a second communication connection address of the first device, and synchronization information used for synchronization of a second communication connection.

Advantageous Effects

According to this specification, by directly requesting Bluetooth pairing to a device that wants a connection using an InfraRed signal, user satisfaction can be improved.

Further, according to this specification, by providing Bluetooth connection information (or pairing information) using an InfraRed signal, an inconvenient pairing initialization process can be removed, a Bluetooth connection with a device that wants a connection can be performed at any time and thus user satisfaction can be improved and a Bluetooth pairing time can be shortened.

Further, in this specification, as a plurality of remote controllers share control authority of a specific device, the specific device can be controlled using the plurality of remote controllers and thus an inconvenient situation in which a user exchanges the remote controllers can be solved.

The effect of this specification is not limited to the above-described effects and the other effects will be understood by those skilled in the art from the following description.

BRIEF DESCRIPTION OF THE DRAWINGS

FIG. 5 is a diagram illustrating another example of a device-to-device Bluetooth connection procedure.

FIG. 6A, FIG. 6B and FIG. 6C are diagrams illustrating an example of a Bluetooth connection method using infrared rays suggesting in this specification.

BEST MODE

Hereinafter, an exemplary embodiment of the present invention will be described in detail with reference to the drawings.

Suffixes "module" and "unit" of constituent elements to be used in the following description are provided to facilitate a description of this specification, and the "module" and "unit" may be used with mixed.

A device described in this specification is a device in which wireless communication is available and includes a mobile terminal including a smart phone, a tablet PC, a desktop computer, a notebook computer, and a television (TV) including a smart TV and an Internet Protocol Television (IPTV).

Further, exemplary embodiments of the present invention are described in detail hereinafter with reference to the attached drawings, but the present invention is not limited by the exemplary embodiments or is not limited thereto.

In terms used in this specification, recently widely using general terms are selected in consideration of a function in the present invention, but the terms may be changed according to an intention of a person of ordinary skill in the art, practice, or appearance of new technology.

Further, in a specific case, terms randomly selected by an applicant exist, and in this case, in a corresponding description portion of the invention, a meaning thereof will be described.

Therefore, terms used in this specification should be analyzed based on a substantial meaning of a term thereof and an entire content of this specification instead of a name of a simple term.

FIG. 1 is a diagram illustrating an example of a Bluetooth communication architecture to which methods suggesting in this specification may be applied.

Figure 1A:
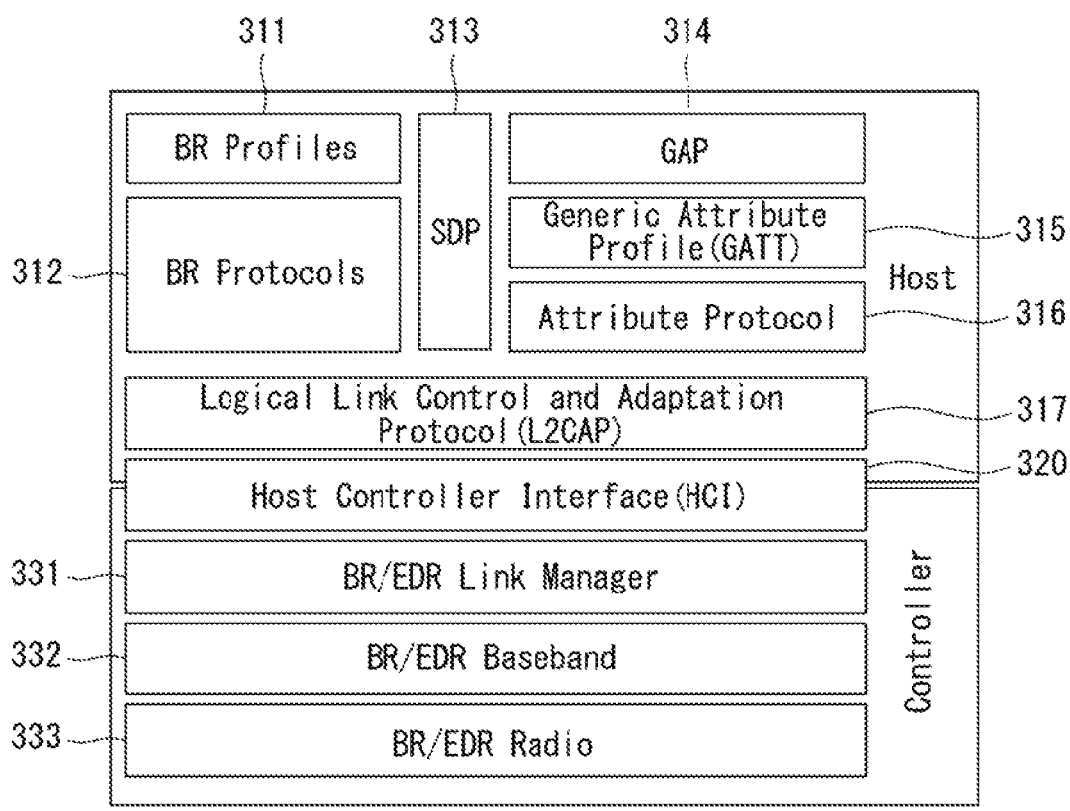
FIG. 1A and FIG. 1B are diagrams illustrating an example of a Bluetooth communication architecture to which methods suggesting in this specification may be applied.
Figure 1B:
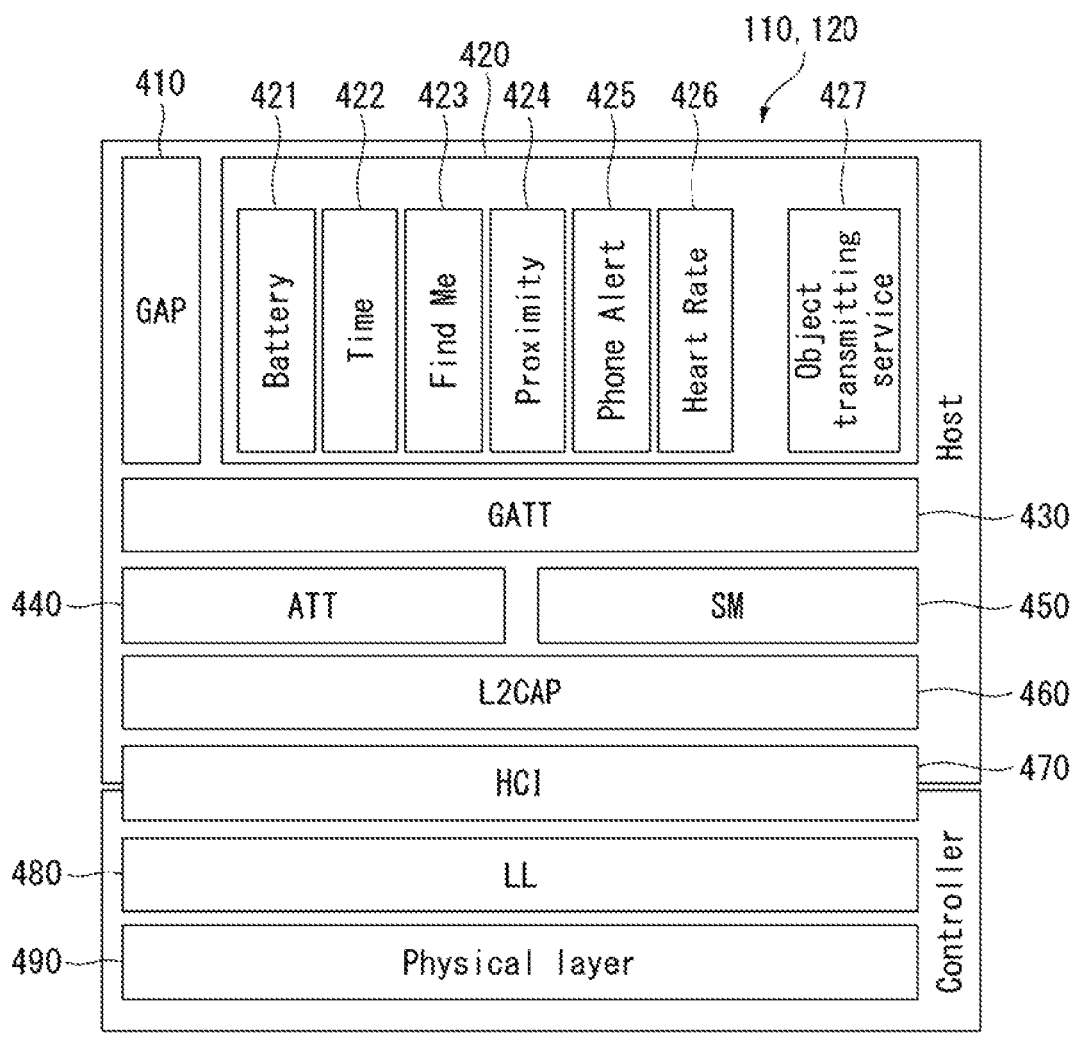

Specifically, FIG. 1A illustrates an example of an architecture of a Bluetooth Basic Rate (BR)/Enhanced Data Rate (EDR), and FIG. 1B illustrates an example of an architecture of Bluetooth Low Energy (LE).

First, as shown in FIG. 1A, a Bluetooth BR/EDR architecture includes a controller stack 330, a Host Controller Interface (HCI) 320, and a host stack 310.

The controller stack (or controller module) 330 indicates a wireless transmitting and receiving module that receives a Bluetooth signal of 2.4 GHz and hardware for transmitting or receiving a Bluetooth packet and may include a BR/EDR radio layer 333, a BR/EDR baseband layer 332, and a BR/EDR link manager layer 331.

The BR/EDR radio layer 333 transmits and receives 2.4 GHz wireless signal, and when using Gaussian Frequency Shift Keying (GFSK) modulation, by hopping 79 RF channels, the BR/EDR radio layer 333 may transmit data.

The BR/EDR baseband layer 332 performs a function of transmitting a digital signal, selects a channel sequence that performs hopping of 1600 times per second, and transmits a time slot of a length 625 us on each channel basis.

The link manager layer 331 controls general operations (link setup, control, and security) of a Bluetooth connection using a Link Manager Protocol (LMP).

The link manager layer may perform the following functions.

performs ACL/SCO logical transport, logical link setup, and control.

Detach: stops a connection and notifies another party device of a stop reason.

performs power control and role switch.

performs a security (authentication, pairing, and encryption) function.

The HCI layer 320 provides an interface between the host module 310 and the controller module 330 to enable a host to provide a command and data to a controller and enables a controller to provide an event and data to the host.

The host stack (or host module) 310 includes a Logical Link Control and Adaptation Protocol (L2CAP) 317, a Service Discovery Protocol (SDP) 313, BR/EDR Protocols 312, BR/EDR Profiles 311, an Attribute Protocol 316, a Generic Access Profile (GAP) 314, and a Generic Attribute Profile (GATT) 315.

The L2CAP 317 provides one bi-directional channel for transmitting data to a specific protocol or profile.

The L2CAP multiplexes various protocols and profiles provided by a Bluetooth superordinate layer.

The L2CAP of the Bluetooth BR/EDR uses a dynamic channel, supports a protocol service multiplexer, retransmission, and streaming mode, and provides segmentation and reassembly, per-channel flow control, and error control.

The SDP 313 is a protocol that searches for a service (Profile and Protocol) supported by the Bluetooth device.

The BR/EDR Protocols and Profiles 312 and 311 define a service (profile) using the Bluetooth BR/EDR and define an application protocol that gives and receives these data.

The Attribute Protocol 316 defines a rule for accessing to data of another party device with a Server-Client structure. The following six message (Request message, Response message, Command message, Notification message, and Indication message) types exist.

Request message from client to server with Response message from server to client Command message from client to server without Response message Notification message from server to client without Confirm message Indication message from server to client with Confirm message from client to server The GATT 315 defines an attribute type.

The GAP 314 finds and connects a device, defines a method that provides information to a user, and provides privacy.

As shown in FIG. 1B, the BLE structure includes a controller stack that may operate to process a wireless device interface in which timing is important and a host stack that may operate to process high level data.

Figure 2:
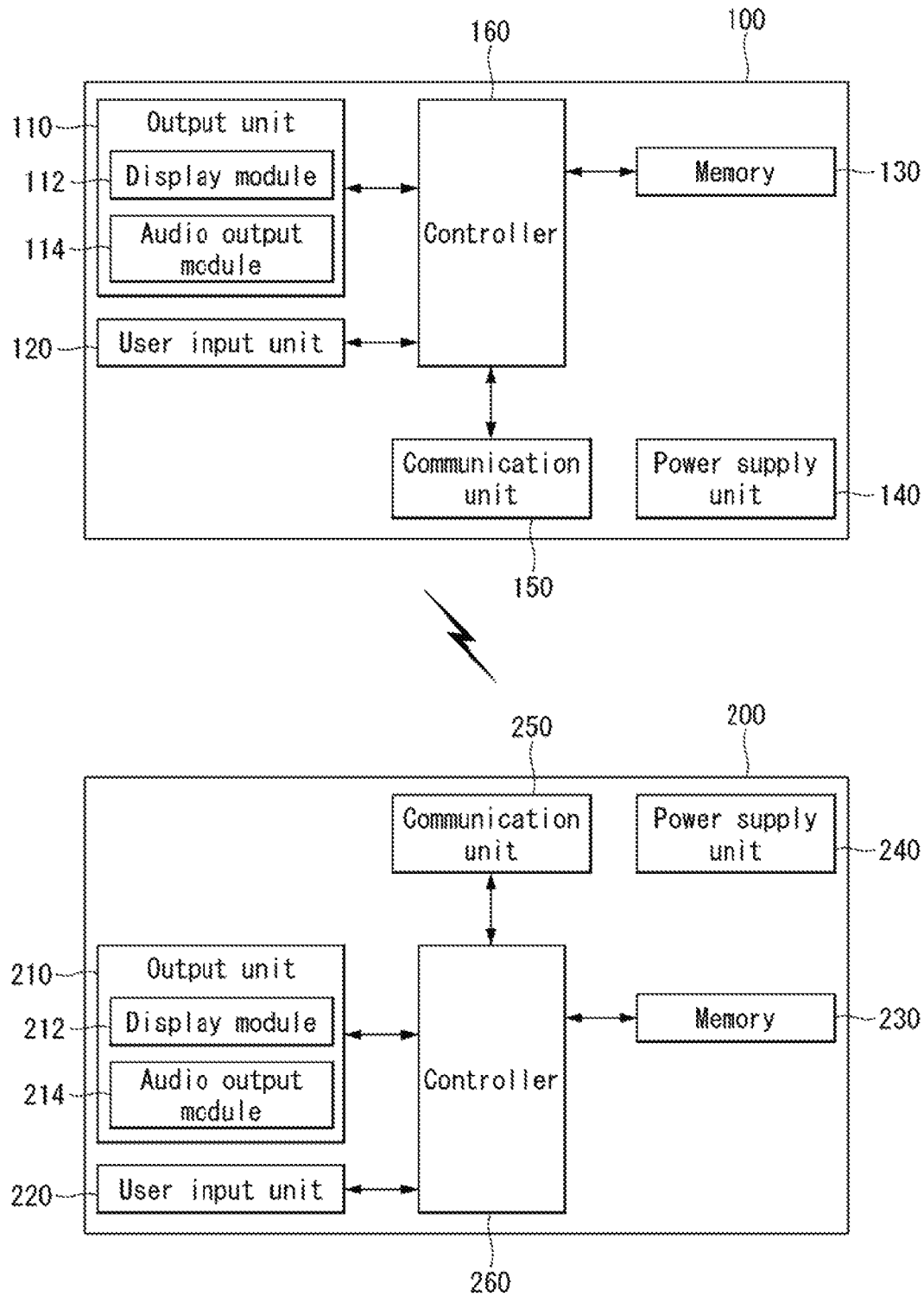
FIG. 2 is a block diagram illustrating a configuration of devices to which methods suggesting in this specification may be applied.

The controller stack may be called a controller, but in order to avoid being confused with the processor which is an internal element of a device described in FIG. 2, the name of the controller stack is preferred in what follows.

First, the controller stack can be implemented by using a communication module which can include a Bluetooth wireless device and a processor module which can include a processing device such as a microprocessor.

The host stack can be implemented as part of the OS operating on the processor module or as a package instance on the OS.

In some cases, the controller stack and the host stack can be operated or carried out on the same processing device within the processor module.

The host stack comprises Generic Access Profile (GAP) 410, GATT based Profiles 420, Generic Attribute Profile (GATT) 430, Attribute Protocol (ATT) 440, Security Manager (SM) 450, and Logical Link Control and Adaptation Protocol (L2CAP) 460. The host stack is not limited to the aforementioned composition, but can include various protocols and profiles.

By using the L2CAP, the host stack multiplexes various protocols and profiles that Bluetooth specification provides.

First, the L2CAP 460 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 450 authenticates a device, which is a protocol for providing key distribution.

The Attribute Protocol (ATT) 440 relies on a server-client structure, which defines rules for the corresponding device to access data. Six message types are defined: Request, Response, Command, Notification, Indication, and Confirmation.

① Request and Response message: Request message is used when a client device requests specific information from a server device, and Response message is used in response to the Request message, which is transmitted from the server device to the client device.

② Command message: It is transmitted from the client device to the server device to indicate a command for specific operation, but the server device does not transmit a response to the Command message to the client device.

③ Notification message: The server device transmits this message to the client device to notify of an event, but the client device does not transmit a confirmation message with respect to the Notification message to the server.

④ Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

The GAP is used mainly for device discovery, connection establishment, and security; defines a method for providing information to a user; and defines the following attribute types.

① Service: a combination of behaviors related to data. Defines basic operation of a device.

② Include: defines a relationship between services.

③ Characteristics: a data value used by a service

④ Behavior: a format that can be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.

Time: method for exchanging time information.

FindMe: provides an alarm service according to a distance.

Proximity: method for exchanging battery information.

The GATT can be used as a protocol by which to describe how ATT is utilized at the time of composing services. For example, the GATT can be used to define how ATT profiles are grouped together with services and to describe characteristics associated with the services.

Therefore, GATT and ATT describe device states and services; and how features are associated with each other and how they are used.

The controller stack comprises a physical layer 490, link layer 480, and host controller interface 470.

The physical layer (wireless transmission and reception module 490) transmits and receives a radio signal of 2.4 GHz; and uses Gaussian Frequency Shift Keying (GFSK) modulation and frequency hopping utilizing 40 RF channels.

The link layer 480 transmits or receives Bluetooth packets.

Also, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack can provides commands and data to the controller stack and the controller stack can provide events and data to the host stack.

In what follows, the procedure of Bluetooth Low Energy (BLE) will be described briefly.

The BLE procedure comprises a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption can be reduced in the BLE controller stack.

An advertising device or a scanning device can perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device can ignore advertisement packets transmitted from an advertising device.

The device filtering procedure can be used even in the connection request procedure. If device filtering is used for the connection request procedure, the need for transmitting a response to a connection request can be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (in what follows, they are called listening deives).

The advertising procedure is used to establish a Bluetooth connection to a nearby initiating device.

Or the advertising procedure can be used to provide periodic broadcast of user data to the scanning devices performing listening through an advertising channel.

In the advertising procedure, all of the advertisement (or advertisement events) are broadcast through an advertising physical channel.

Advertising devices can receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part.

An advertising device can receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device can resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure can be used while the scanning device is being connected to another BLE device in a BLE piconet.

If the scanning device receives a broadcast advertising event and stays in an initiator mode where a connection request can be initiated, the scanning device can initiate a Bluetooth connection to an advertising device by sending a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (in what follows, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that can be scanned. A Bluetooth device that can be found and used by another device is called a discoverable device, and the discoverable device actively broadcasts an advertisement event so that other devices can scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure can be a primary task to be performed, and as a result, only one device will respond to the advertisement. After receiving a connectable advertisement event from an advertising device, the connecting procedure can be initiated by sending a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event comprises at least one advertising PDU, and advertising PDUs are transmitted through advertising channel indices used. Each advertisement event can be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scanInterval is defined as an interval between start points of two consecutive scan windows.

When there is no scheduling collision, the link layer has to perform listening to complete all of the scanIntervals of scanWindows as commanded by the host. In each scanWindow, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device can be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a pre-existing connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Also, once connected to a slave device, the master device sets up timing and supervises periodic data exchange.

At this time, the timing can be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet comprises four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU comprises a 16 bit header and a payload of various size.

The PDU type filed of the advertising channel included in the header supports PDU types as defined in Table 1 below.

TABLE 1

| PDU Type | PACKet Name |
|---|---|
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that can be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU comprises a 16 bit header and a payload of various size; and can include a Message Integrity Check (MIC) field.

The procedures, states, and packet formats of the BLE technology descried above can be applied to perform the methods according to the present invention.

Block Diagram Illustrating Configuration Of Devices

FIG. 2 is a block diagram illustrating a configuration of devices to which methods suggesting in this specification may be applied.

A connection initiating device 100 transmits a request message that provides a command to a connection target device 200 or receives and processes a request message requested by the connection target device 200.

The connection initiating device 100 transmits a request message to the connection target device 200, processes a response message transmitted from the connect target device, and provides an UI to a user.

Further, the connection initiating device 100 receives a request message requested by the connect target device, processes the received message, and provides an UI to the user.

The connection initiating device may be a first device or a second device to be described later.

The connection target device 200 transmits a request message that provides an instruction to the connection initiating device or receives and processes a request message requested by the connection initiating device.

The connection target device 200 may be represented with a remote device or an initiated device.

Further, the connection target device 200 transmits a request message to the connection initiating device, receives a response message transmitted from the connection initiating device, processes the received message, and provides an UI to the user.

The connection initiating device may be a first device or a second device to be described later.

The connection initiating device 100 and the connection target device 200 may be a personal computer, a personal digital assistant (PDA), a mobile phone, a remote controller, a TV, a headphone, or an AV device (car system, headphone, player/recorder, timer, tuner, and monitor).

The connection initiating device 100 and the connection target device 200 may include output units 110 and 210, user interface units 120 and 220, memories 130 and 230, power supply units 140 and 240, communication units 150 and 250, controllers (processors) 160 and 260, and data processors 170 and 270, respectively.

The output unit, the user interface unit, the memory, the power supply unit, the communication unit, and the controller are functionally connected to perform a method suggesting in the present invention.

Constituent elements of FIG. 2 are not essential elements and thus an electronic device having constituent elements larger than or fewer than those of FIG. 2 may be implemented.

The output units 110 and 210 generate an output related to visual sense, auditory sense, or tactile sense and may include display modules 112 and 212 and audio output modules 114 and 214, respectively.

The display modules 112 and 212 display information processed by the device. For example, when the device is in a communication mode, the display modules 112 and 212 may display a User Interface (UI) or a Graphic User Interface (GUI) related to communication. When the device is in an audiovisual communication mode or a photographing mode, the display modules 112 and 212 may display a photographed or/and received image, UI, or GUI.

The display modules 112 and 212 may include at least one of a liquid crystal display (LCD), a thin film transistor-liquid crystal display (TFT LCD), an organic light emitting diode (OLED), a flexible display, and a three-dimensional display (3D display).

The audio output modules 114 and 214 may output audio data received from the communication unit or stored at the memories 130 and 230, respectively, in a call signal receiving mode, a communication mode or a recording mode, a voice recognition mode, and a broadcasting receiving mode. The audio output modules 114 and 214 may output an audio signal related to a function (e.g., a call signal receiving sound, a message receiving sound) performed in the device.

Such audio output modules 114 and 214 may include a receiver, a speaker, a buzzer, and a microphone.

The microphone may receive a tone transmitted by another party device, and the speaker may transmit a tone to another party device.

The user input units 120 and 220 generate a user's input data for controlling operation of a terminal. The user input units 120 and 220 may include a key pad, a dome switch, a touch pad (capacitive/resistive), a jog wheel, and a jog switch.

The memories 130 and 230 may store a program for operation of the controllers 160 and 260, respectively and temporarily store input/output data. Further, the memories 130 and 230 may store data on a vibration and audio of various patterns output upon inputting a touch on the touch screen.

The memories 130 and 230 store various information of the terminal and are connected to the controller to store a program, an application, a general file, and input/output data for operation of the controllers 160 and 260, respectively.

The memories 130 and 230 may include a storage medium of at least one type of a flash memory type, a hard disk type, a multimedia card micro type, a card type memory (e.g. SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The power supply units 140 and 240 are modules that receive application of external power and internal power under the control of the controllers 160 and 260, respectively to supply power necessary for operation of each constituent element.

The communication units 160 and 260 may include at least one module that enables wireless communication between the device and a wireless communication system or between the device and a network in which the device is located. For example, the communication units 160 and 260 may include a broadcasting receiving module (not shown), a mobile communication module (not shown), a wireless Internet module (not shown), and a short range communication module (not shown).

The communication units 160 and 260 may be referred to as a transmitting/receiving unit.

The mobile communication module transmits and receives a wireless signal to and from at least one of a base station, an external terminal, and a server on a mobile communication network. The wireless signal may include various forms of data according to transmission and reception of a voice call signal, an audiovisual communication call signal, or a text/multimedia message.

The wireless Internet module is a module for a wireless Internet connection and may be housed at the outside or the inside of the device. As wireless Internet technology, Wireless LAN (WLAN)(Wi-Fi), Wireless broadband (Wibro), World Interoperability for Microwave Access (Wimax), and High Speed Downlink Packet Access (HSDPA) may be used.

The device may perform a Wi-Fi Peer to Peer (P2P) connection with another device through the wireless Internet module. A device-to-device streaming service may be provided through a Wi-Fi P2P connection, and the device is connected to a data transmitting/receiving device or a printer to provide a printing service.

The short range communication module is a module for short range communication. As short range communication technology, Bluetooth, Radio Frequency Identification (RFID), Infrared Data Association (IrDA), Ultra Wideband (UWB), and ZigBee may be used.

Further, the communication units 150 and 250 enable transmission of a message such as an initiating device-initiated device command, request, action, and response or data.

The controllers 160 and 260 are modules that control general operations of the connection initiating device and the connect target device and may control to process a transmitting request of a message to a Bluetooth interface and another communication interface and a received message.

The controllers 160 and 260 may be referred to as a controller, a micro controller, and a microprocessor, and the controllers 160 and 260 may be implemented by hardware, firmware, software, or a combination thereof.

The controllers 160 and 260 may include an application-specific integrated circuit (ASIC), another chipset, a logic circuit and/or a data processor.

Figure 3:
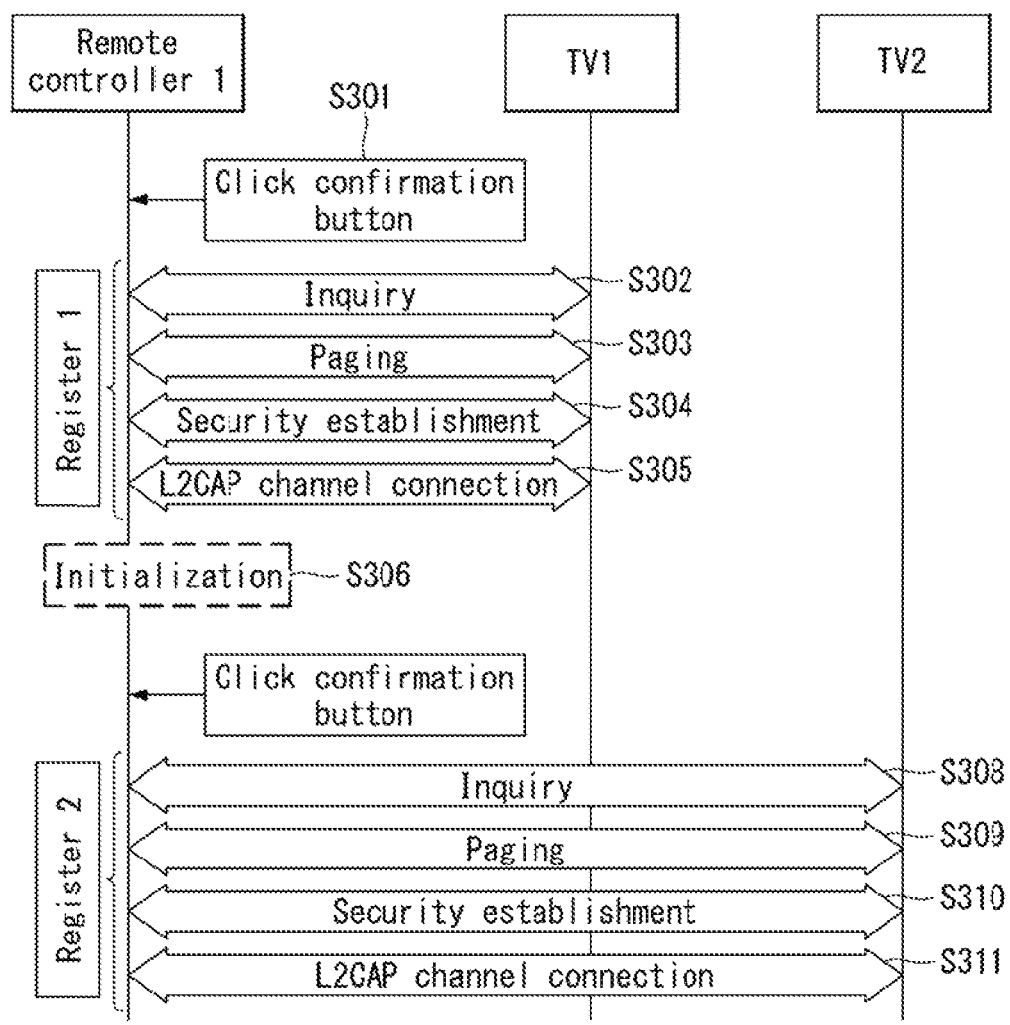
FIG. 3 is a flowchart illustrating an example of a Bluetooth connection procedure.

FIG. 3 is a flowchart illustrating an example of a Bluetooth connection procedure.

A first device may represent a device, i.e., an initiator that initiates a connection request, and a second device may represent a device, i.e., a responder that responds to the connection request.

The second device may be represented with a pairing device.

Hereinafter, for convenience, the first device may be represented with a remote controller (or a magic remote control) or a terminal (or smart phone), and the second device may be represented with a TV.

As shown in FIG. 3, the magic remote control performs a Bluetooth connection with a TV 1.

The Bluetooth connection may be represented with Bluetooth registration or Bluetooth pairing.

Specifically, the magic remote control receives a confirmation input of a specific button (confirmation button) thereof from the user (S301).

Thereafter, the magic remote control performs an inquiry procedure for finding at least one peripheral Bluetooth device (S302).

When specifically describing the inquiry procedure, in order to acquire information, i.e., Bluetooth related information about the TV1 existing at a periphery, the magic remote control transmits an inquiry message to the TV1.

Thereafter, the magic remote control receives an Extended Inquiry Response (EIR) message including Bluetooth address (BD_ADDR) information representing a Bluetooth address of the TV1 and native clock information representing time offset of a reference clock from the TV1.

Thereafter, the magic remote control performs a paging procedure with the TV1 based on the received EIR message (S303).

The paging procedure is a procedure that sets a connection with a specific Bluetooth device (Responder) to perform a Bluetooth connection among peripheral Bluetooth devices in which the initiator found through the inquiry procedure.

Specifically, the magic remote control transmits a paging request message including frequency hopping sequence information thereof and clock information to the TV1.

Thereafter, the TV1 receives a paging request message through a paging scan channel and is synchronized with the magic remote control using the frequency hopping sequence information and clock information received from the magic remote control.

When the paging procedure is complete, the initiator becomes a master, and the responder becomes a slave.

That is, after step S303, the magic remote control may be represented with a master, and the TV1 may be represented with a slave.

Thereafter, the magic remote control and the TV1 perform a security establishment procedure (S304).

The security establishment procedure is performed by a link manager, and encryption and authentication procedures according to a security mode are performed.

Thereafter, the magic remote control and the TV1 perform an L2CAP connection procedure (S305).

That is, the magic remote control sets a connection for transmitting and receiving data in which a superordinate layer profile provides through L2CAP.

Thereafter, for a new Bluetooth connection with another Bluetooth device (TV2), the magic remote control should perform Bluetooth pairing initialization (S306).

For example, the Bluetooth pairing initialization may be performed by simultaneously pressing a 'previous button' and a 'home button' of the magic remote control for a predetermined time (5 second or 7 second) or more.

Thereafter, for a Bluetooth connection with a TV2, the magic remote control performs again steps S301 to S305 with the TV2 (S307 to S311).

As described with reference to FIG. 3, in order for a device in which Bluetooth pairing is formed to newly form Bluetooth pairing with another Bluetooth device, inconvenience in use may occur that the device should perform a pairing initialization procedure every time.

Figure 4:
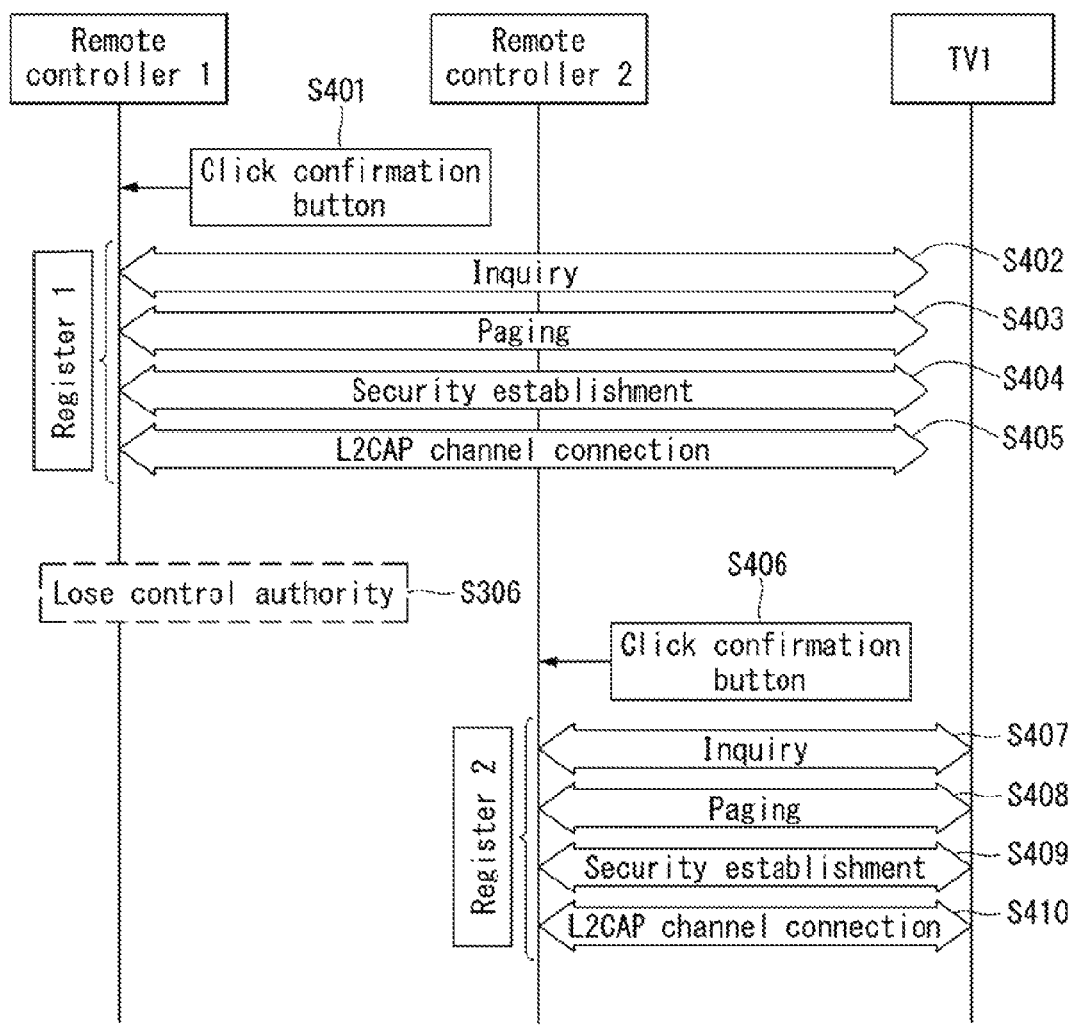
FIG. 4 is a flowchart illustrating another example of a device-to-device Bluetooth connection procedure.

FIG. 4 is a flowchart illustrating another example of a device-to-device Bluetooth connection procedure.

FIG. 4 illustrates a case in which a specific magic remote control loses control authority thereof when a plurality of magic remote controls attempt a Bluetooth connection with one TV.

Referring to FIG. 4, a magic remote control 1 sets a Bluetooth connection with a TV through steps S401 to S405 (the same as steps S301 to S305 of FIG. 3).

Thereafter, when a magic remote control 2 sets a Bluetooth connection with the TV through steps S406 to S410 (the same as steps S301 to S305 of FIG. 3), the magic remote control 1 loses control authority of remote control for the TV.

In this case, the magic remote control 1 may not form new pairing with another Bluetooth device until Bluetooth pairing initialization is executed.

FIG. 5 is a flowchart illustrating another example of a device-to-device Bluetooth connection procedure.

Specifically, FIG. 5 illustrates a method of settling a device-to-device Bluetooth connection using Received Signal Strength Indication (RSSI).

As shown in FIG. 5, when device-to-device Bluetooth pairing is formed according to RSSI, a magic remote control 1 forms pairing with a TV1 located at a location adjacent thereto, and a magic remote control 2 forms pairing with a TV2 located at a location adjacent thereto.

In this case, as shown in FIG. 5, a situation may occur in which the magic remote control forms Bluetooth pairing with an unwanted device.

Hereinafter, in order to remove an initialization procedure of Bluetooth pairing and to more accurately perform Bluetooth pairing, a device-to-device Bluetooth connection method using InfraRed (IR) suggesting in this specification will be described in detail.

FIG. 6 is a diagram illustrating an example of a Bluetooth connection method using infrared rays suggesting in this specification.

FIG. 6A illustrates a Bluetooth connection method between one magic remote control and one TV when the magic remote control and the TV exist at a specific location.

For a Bluetooth connection with a specific device, the magic remote control may have a Bluetooth button (hereinafter, referred to as a 'BT button') that can transmit a Bluetooth connection request signal.

Referring to FIG. 6A, when the magic remote control receives an input signal to a BT button from a user (S601), the magic remote control transmits an IR signal for requesting a Bluetooth connection to the TV (S602).

The IR signal may be transmitted to the TV using an ITT protocol.

The ITT protocol is a transmitting protocol for transferring an IR signal (or message).

Figure 6B:
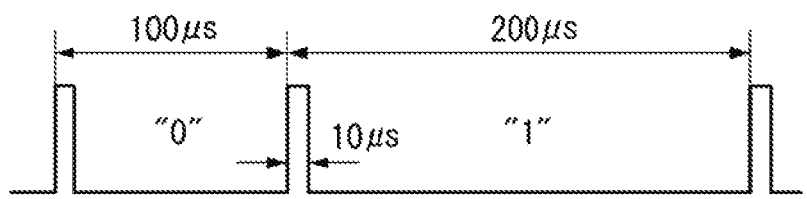

As shown in FIG. 6B, in data encoding defined in the ITT protocol, (1) one single command may be formed with 14 pulses having an area of 10 us, and (2) pulse distance encoding may be used. For example, when a gap from a next pulse is 100 us, '0' may be represented, and when a gap from a next pulse is 200 us, '1' may be represented.

Figure 6C:
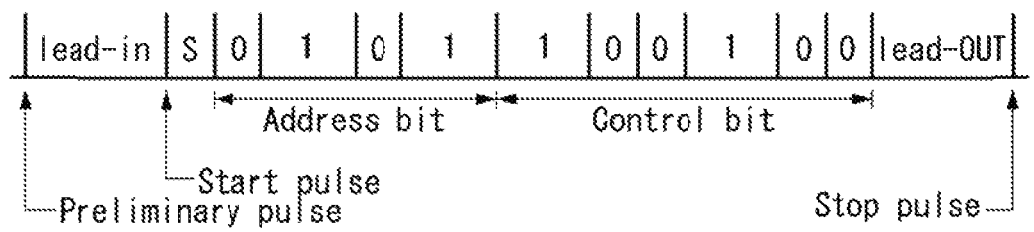

As shown in FIG. 6C, in an ITT protocol, 4 bit of address may be used, and 6 bit of command may be used.

For example, in command 'No. 33' defined in the ITT protocol, a Bluetooth (BT) connection trigger function may be included.

Therefore, the IR signal may be a command of an ITT protocol for Bluetooth pairing trigger. Thereafter, the TV, having received the IR signal searches for another party device and exchanges device related information through an inquiry procedure with the magic remote control (S603).

After transmitting an IR signal, i.e., a command for BT connection trigger for a Bluetooth connection, the magic remote control is in an inquiry scan (or inquiry) state, and when receiving the command, the TV is in an inquiry (or inquiry scan) state, unlike a state of the magic remote control.

In BLE, after transmitting an IR signal, the magic remote control may be in an advertising state or an initiating state, and when the TV receives the IR signal, the TV may be in an initiating state or an advertising state, unlike the magic remote control.

Specifically, the magic remote control transmits an inquiry message including Bluetooth connection information to the TV.

The Bluetooth connection information may be Bluetooth version information, Bluetooth type information, and Bluetooth address information of the magic remote control.

The Bluetooth type information may be type information representing the support of Bluetooth Basic Rate (BR)/Enhanced Data Rate (EDR) technology and/or type information representing the support of Bluetooth low power energy technology.

The TV transmits an Extended Inquiry Response (EIR) message in response to the inquiry message to the magic remote control.

Here, the EIR may include Bluetooth information related to the TV.

The Bluetooth information related to the TV may be Bluetooth version information, Bluetooth type information, and Bluetooth address information of the TV.

The TV may be synchronized with the magic remote control based on the inquiry message. However, synchronization of the magic remote control and the TV may be performed at a paging procedure of step S604.

Thereafter, the magic remote control performs a paging procedure for setting a Bluetooth connection with the TV (S604).

The TV may be synchronized with the magic remote control using hopping sequence information and native clock information received from the magic remote control through the paging procedure.

As described above, the hopping sequence information and the native clock information may be exchanged through an inquiry procedure or a paging procedure.

Thereafter, the magic remote control completes a Bluetooth connection through a security establishment procedure and an L2CAP channel connection procedure with the TV and transmits and receives data using a superordinate layer Bluetooth profile (S605 to S607).

Figure 7:
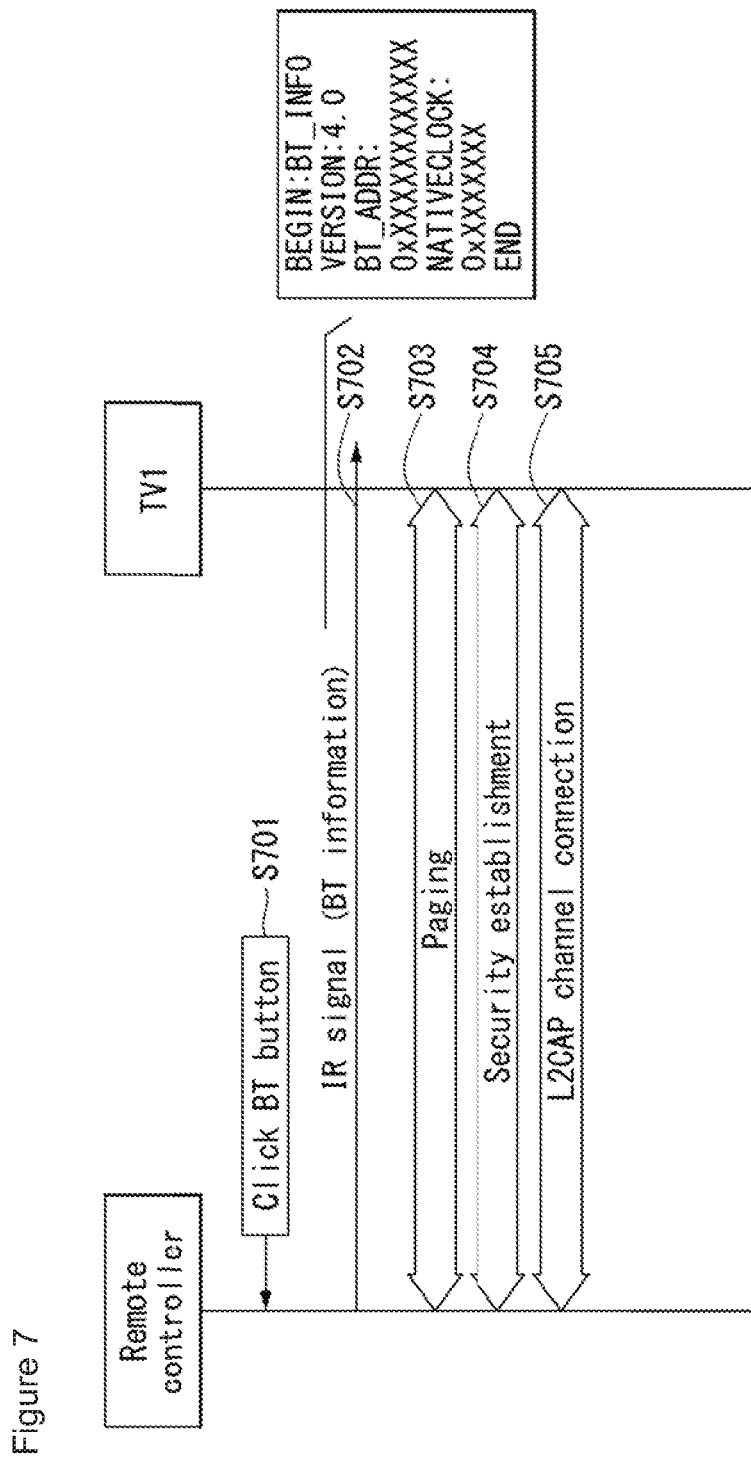
FIG. 7 is a flowchart illustrating another example of a Bluetooth connection method using infrared rays suggesting in this specification.

FIG. 7 is a flowchart illustrating another example of a Bluetooth connection method using infrared rays suggesting in this specification.

Steps S701 and S703 to S705 are the same as steps S601 and S604 to S606 of FIG. 6 and therefore a detailed description thereof may be omitted.

A magic remote control transmits an IR signal including Bluetooth connection information to a TV (S702).

Here, the IR signal has an IrLAP Frame structure using in IrDA.

An IrLAP Frame of IrLAP 1.0 is defined to transmit and receive information of about 115 Kbps.

That is, the IrLAP Frame may include a BOF field (8 bits), an Address field (8 bits) representing an address, a Control field (8 bits) representing control, Information field (N*8bits) including information, an FCS field (16 bits), and an EOF field (8 bits).

Therefore, the Bluetooth connection information is included in the Information field of the IR signal frame.

The Information field of the IR signal frame may include the N number of information having a size of 8 bits. The Bluetooth connection information may include Bluetooth version (BT_Version) information, Bluetooth type (BT Type) information, Bluetooth address (BT_ADDR) information, and native clock information for synchronization of the magic remote control.

When the BT_Version information and the BT Type information is included in the Information field of the IR signal frame, the BT_Version information and the BT Type information each may be represented with a size of 8 bit.

Table 2 represents an example of a BT_Version information format included in the IR signal Frame.

TABLE 2

| $7^{th}$ bit | $6^{th}$ bit | $5^{th}$ bit | $4^{th}$ bit | $3^{rd}$ bit | $2^{nd}$ bit | $1^{st}$ bit | $0^{th}$ bit |
|---|---|---|---|---|---|---|---|
| RFU | 4.2 | 4.1 | 4.0 | 3.1 | 3.0 | 2.1 | |

Table 3 represents an example of a BT Type information format included in the IR signal Frame.

TABLE 3

| $7^{th}$ bit | $6^{th}$ bit | $5^{th}$ bit | $4^{th}$ bit | $3^{rd}$ bit | $2^{nd}$ bit | $1^{st}$ bit | $0^{th}$ bit |
|---|---|---|---|---|---|---|---|
| RFU | | | | | | LE | BR/EDR |

The IR signal may be designated to a specific IR code of 1-2 byte size, and as the specific IR code, a predefined code may be allocated to every TV, i.e., on a production company basis.

Thereafter, the magic remote control and the TV perform a paging procedure (S703).

That is, the magic remote control and the TV enter to a paging sub state to transmit and receive a paging packet.

Here, unlike FIG. 6, in FIG. 7, the TV becomes an initiator to enter to a paging sub state and transmits a paging packet to the magic remote control.

Figure 8:
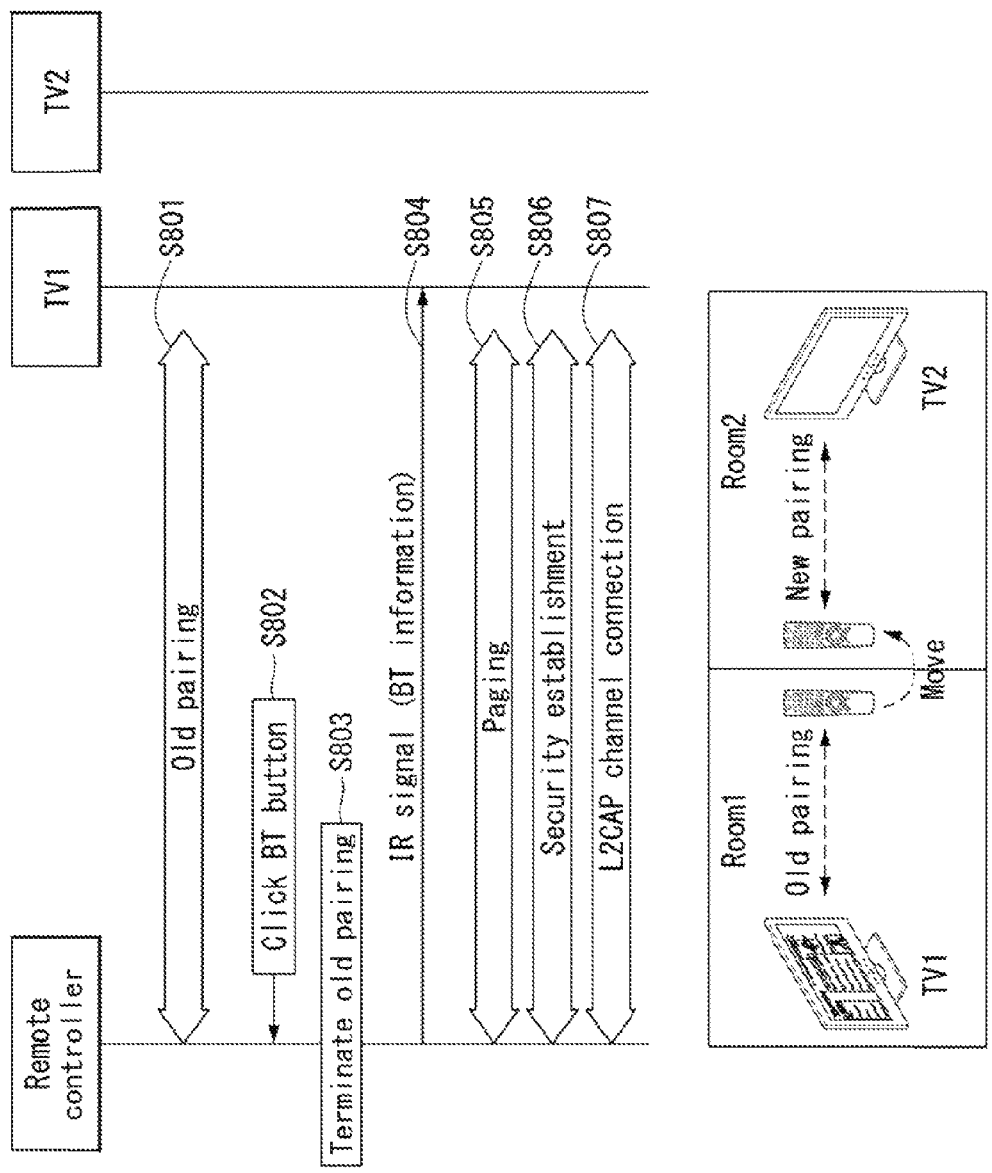
FIG. 8 is a flowchart illustrating another example of a Bluetooth connection method using infrared rays suggesting in this specification.

The magic remote control transmits the Bluetooth connection information with an IR signal, enters to a paging scan sub state, and receives a paging packet transmitted from the TV FIG. 8 is a flowchart illustrating another example of a Bluetooth connection method using infrared rays suggesting in this specification.

That is, FIG. 8 illustrates a new paging procedure, i.e., a procedure in which the magic remote control moves to another location and sets a Bluetooth connection with another device.

Steps S802 and S804 to S807 are the same as steps S701 to S705 of FIG. 7 and therefore a detailed description thereof is omitted, and only dissimilar constituent elements are described here in detail.

Even in a case of FIG. 8, the magic remote control has a Bluetooth button (BT button) for transmitting a Bluetooth connection request signal.

As shown in FIG. 8, the magic remote control forms Bluetooth pairing with a TV1 located at a room 1.

When the magic remote control moves to a room 2 and newly forms pairing with a TV2 located at the room 2, a method in which the magic remote control forms pairing with the TV2 is described.

The magic remote control forms Bluetooth pairing with the TV1 (S801).

Thereafter, in order to form new Bluetooth pairing with the TV2, the magic remote control receives a confirmation input signal of the BT button from a user (S802).

Thereafter, the magic remote control terminates pairing with the TV1 in which pairing is already formed (S803).

Thereafter, the magic remote control transmits an IR signal including Bluetooth connection information to the TV2 (S804).

The Bluetooth connection information may include Bluetooth version (BT_Version) information, Bluetooth type (BT Type) information, Bluetooth address (BT_ADDR) information, and Native Clock information for synchronization of the magic remote control.

Thereafter, the magic remote control and the TV2 set a new Bluetooth connection through a paging procedure, a security establishment procedure, and an L2CAP channel connection procedure (S805 to S807).

Figure 9:
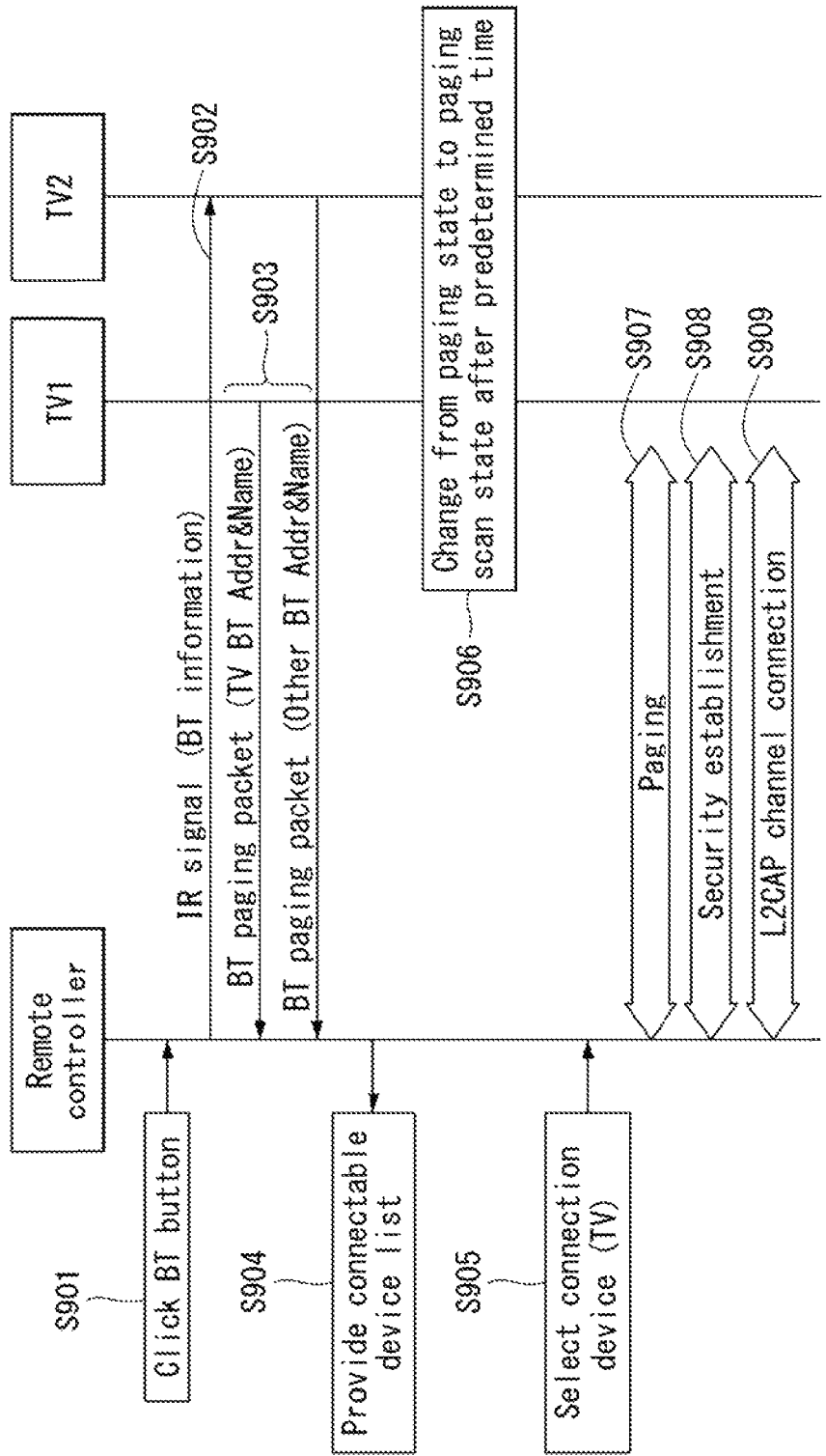
FIG. 9 is a flowchart illustrating another example of a Bluetooth connection method using infrared rays suggesting in this specification.

FIG. 9 is a flowchart illustrating another example of a Bluetooth connection method using infrared rays suggesting in this specification.

FIG. 9 illustrates a method of acquiring connectable device list information and forming Bluetooth pairing in a network environment in which one magic remote control and a plurality of pairing devices (TV) exist.

As shown in FIG. 9, a plurality of pairing devices, i.e., a TV and a DVD player exist.

Steps S901, S902, and S907 to S909 are the same as steps S701 to S705 of FIG. 7 and therefore a detailed description thereof is omitted, and only dissimilar constituent elements are described here in detail.

As shown in FIGS. 6 to 8, the magic remote control has a BT button that transmits a Bluetooth connection request signal for a Bluetooth connection.

After step S901, the magic remote control transmits an IR signal including Bluetooth connection information (S902). Here, the IR signal is transmitted to at least one pairing device.

The Bluetooth connection information may be Bluetooth version (BT_Version) information, Bluetooth type (BT Type) information, Bluetooth address (BT_ADDR) information, and Native Clock information for synchronization of the magic remote control.

Thereafter, at least one device (TV and DVD Player) each, having received the IR signal transmits a paging packet including Bluetooth related information thereof to the magic remote control (S903).

The magic remote control listens, monitors, or receives a paging packet transmitted by the at least one device through a paging scan channel.

The Bluetooth related information may be Bluetooth address (BT_ADDR) information and device name information of each pairing device.

That is, Bluetooth related information included in a transmitting paging packet of the TV may be a Bluetooth address and a name of the TV, and Bluetooth related information included in a transmitting paging packet of the DVD Player may be a Bluetooth address and a name of the DVD Player.

Thereafter, the magic remote control outputs a device list related User Interface (UI) representing devices in which pairing is available, i.e., in which a Bluetooth connection is available based on the paging packet received at step S903 through the output unit (S904).

Thereafter, the magic remote control receives a selection input to a device to connect in a device list representing connectable devices from the user (S905).

Thereafter, the magic remote control performs a paging procedure with the selected pairing device (TV) (S907).

That is, the magic remote control transmits a paging packet to the TV, and the TV receives the paging packet of the magic remote control through a paging scan channel.

Here, pairing devices, i.e., the TV and the DVD player transmit a paging packet to the magic remote control at step S903 and are changed from a paging state to a paging scan state after a predetermined time (S906).

The predetermined time may be a preset time, and information about the predetermined time may be shared through steps S902 to S903.

Additionally, after step S909 (L2CAP channel connection) is complete, the magic remote control may change an UI of the output unit to a remote control UI that can perform remote control.

Therefore, the magic remote control may exchange a Bluetooth profile with the TV through the remote control UI.

Figure 10:
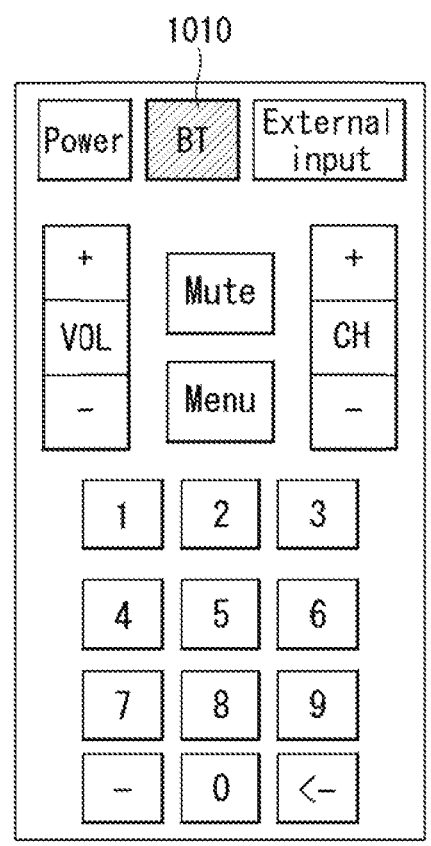
FIG. 10 is a diagram illustrating an example of a remote controller or a remote controller UI suggesting in this specification.

FIG. 10 is a diagram illustrating an example of a remote controller or a remote controller UI suggesting in this specification.

FIG. 10 illustrates a magic remote control or a magic remote control UI including the BT button 1010 of FIGS. 6 to 9, and the magic remote control UI may be implemented through an application of a terminal (smart phone).

Figure 11:
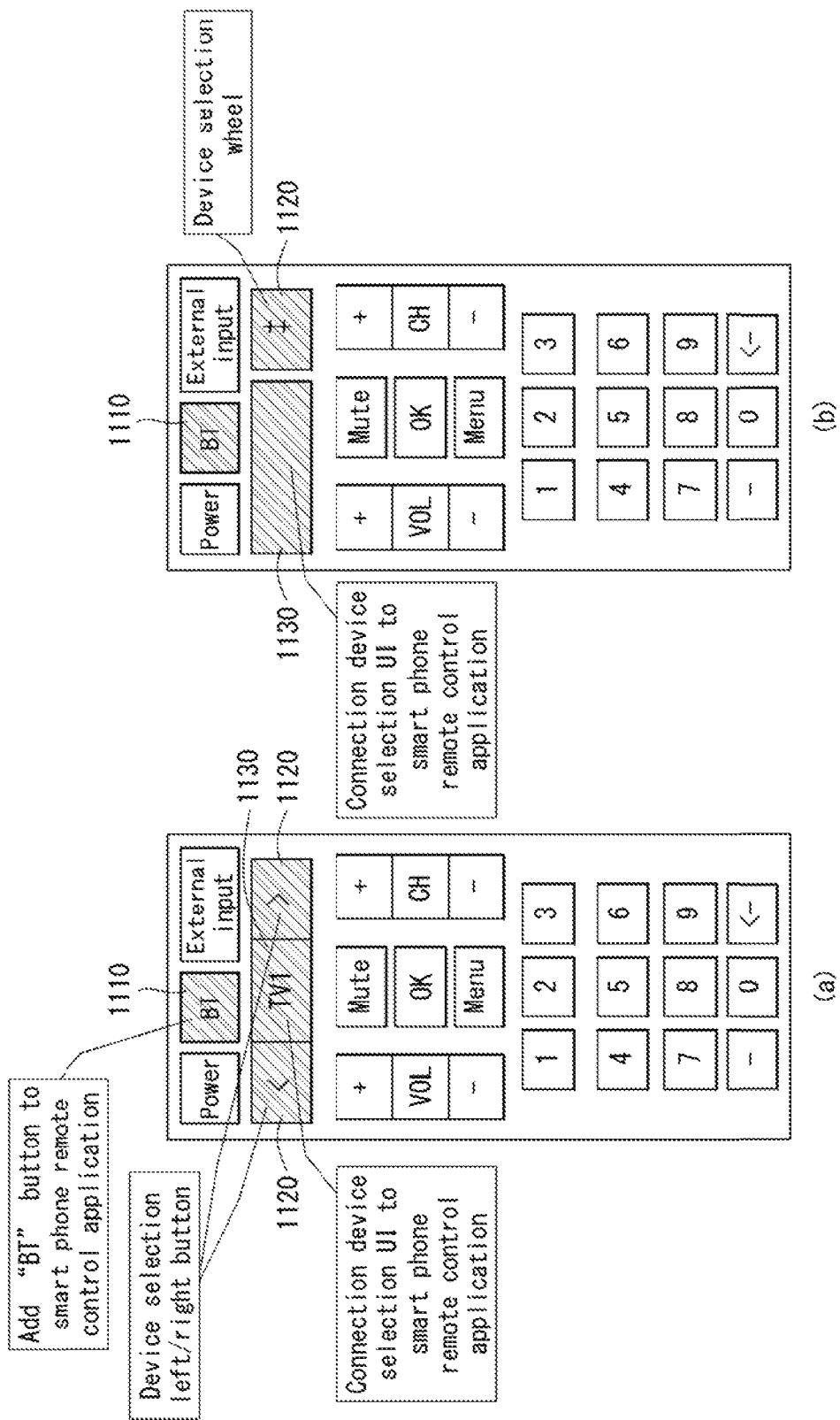
FIG. 11 is a diagram illustrating another example of a remote controller or a remote controller UI suggesting in this specification.

FIG. 11 is a diagram illustrating another example of a remote controller or a remote controller UI suggesting in this specification.

As shown in FIG. 11, the magic remote control or the magic remote control UI may include a first button 1110 that transmits a Bluetooth connection request signal, a second button 1120 that can search for a pairing device, and a display unit 1130 that displays a name of a pairing device selected by the second button.

The first button may be represented with a BT button.

The second button may have a button form that can search for a pairing device through a left/right button and may have a wheel form that can search for a pairing device through a wheel.

FIG. 11A illustrates an example of a magic remote control or a magic remote control UI including a button form of second button, and FIG. 11B illustrates an example of a magic remote control or a magic remote control UI including a wheel form of second button.

That is, the magic remote control may search for and select a pairing device with a user input through the second button, and in order to transmit an IR signal to the selected pairing device, when receiving a user input to the first button, the magic remote control may perform a Bluetooth connection with the selected pairing device.

Figure 12:
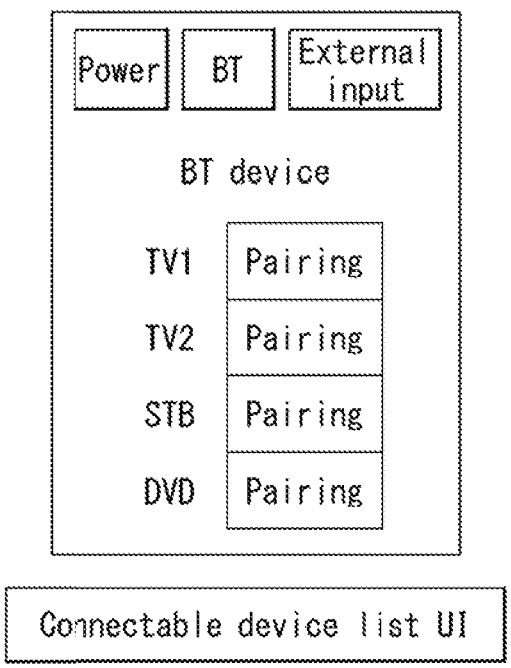
FIG. 12 is a diagram illustrating another example of a magic remote control UI suggesting in this specification.

FIG. 12 is a diagram illustrating another example of a magic remote control UI suggesting in this specification.

That is, FIG. 12 illustrates an UI of a device list output through an output unit of the magic remote control at step S904 of FIG. 9.

Figure 13:
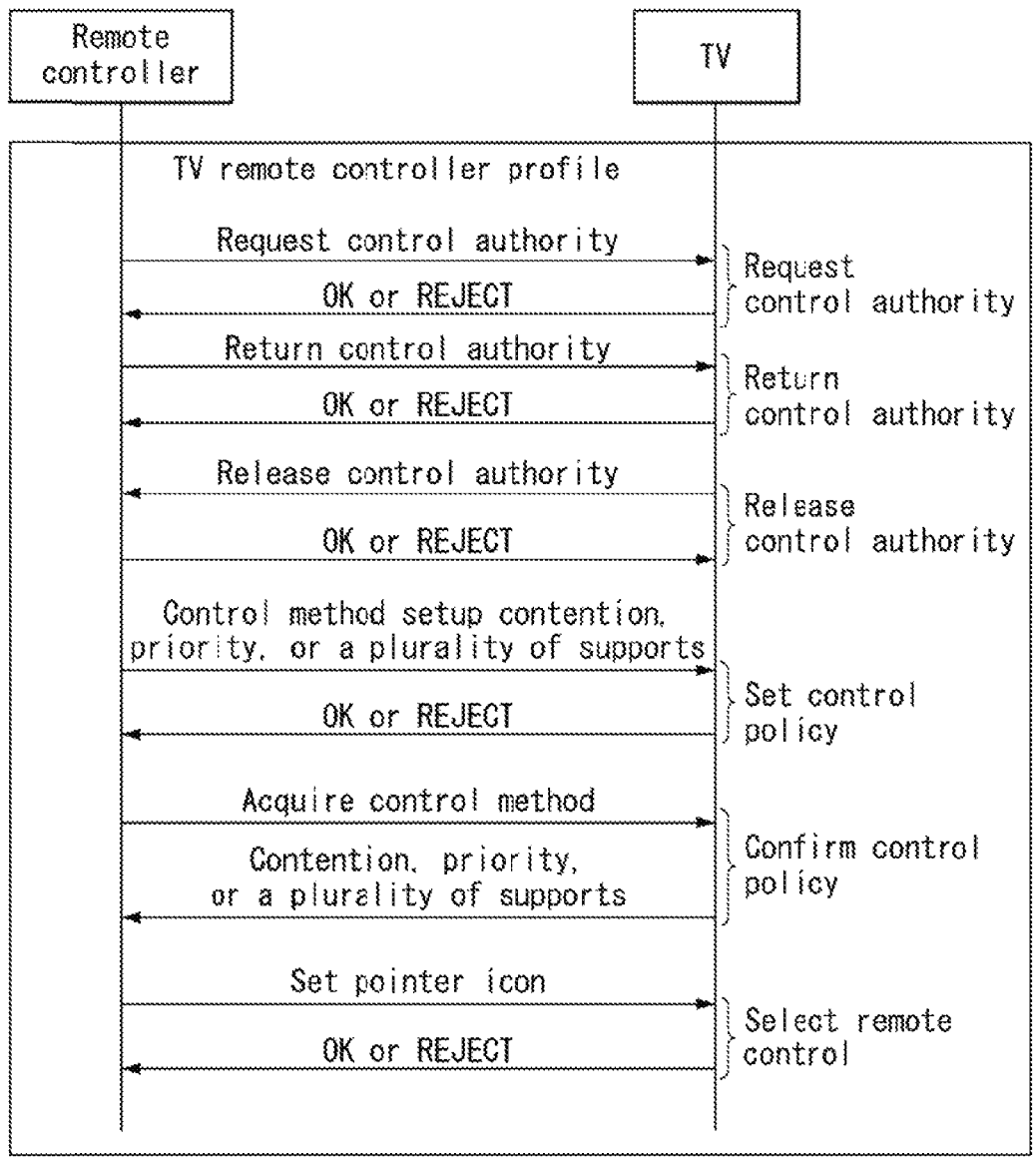
FIG. 13 is a flowchart illustrating an example of a method for acquiring control authority of a remote controller suggesting in this specification.

FIG. 13 is a flowchart illustrating an example of a method for acquiring control authority of a remote control suggesting in this specification.

FIG. 13 illustrates a method related to control authority acquisition for remote control of one pairing device, when a plurality of magic remote controls are connected to one pairing device (TV) by Bluetooth.

Here, one pairing device and a plurality of magic remote controls perform a Bluetooth connection procedure using an IR signal described with reference to FIGS. 6 to 9.

Each method described hereinafter may be performed individually or together with methods suggesting in this specification regardless of description order and may be performed in time series according to description order.

First, a method of requesting control authority for remote control will be described.

The magic remote control may already form pairing with the pairing device, and because the magic remote control did not form pairing with the pairing device, the magic remote control may want to form pairing with the pairing device.

Specifically, the magic remote control transmits a control authority request message for requesting control authority for remote control of the TV to the TV.

Thereafter, the TV determines whether to confirm a control authority request of the magic remote control according to a secured control authority providing policy.

The control authority providing policy may include control authority providing according to contention, control authority providing according to a priority, and control authority support to a plurality of magic remote controls.

The control authority providing policy may be defined to GATT-based characteristics.

That is, GATT Characteristics for supporting control authority providing to a plurality of remote controllers may be def2ined, as shown in Table 4.

TABLE 4

| Characteristic Name | Requirement | Mandatory Properties |
|---|---|---|
| Multi Control Type | | Read, Write, Indication |
| Controller Address | | Read, Write, Indication |

TABLE 4-continued

| Characteristic Name | Requirement | Mandatory Properties |
|---|---|---|
| Number of Controllers | | Read, Write |
| Main Controller | | Read, Write, Indication |

Referring to Table 4, a Multi Control Type characteristic is a value representing a control method of a plurality of remote controllers and may include a contention method type, a priority method type, a monopoly method type, and a shard control method type, as shown in Table 3.

The contention method type is a method in which a plurality of remote controllers acquire control authority through contention.

The priority method type is a method of acquiring control authority according to a priority relationship between a plurality of remote controllers.

The monopoly method type is a method in which one remote controller has control authority and is a method in which other remote controllers do not have control authority, when a designated remote controller has control authority.

The shared method type is a method in which a plurality of remote controllers share control authority.

Next, a Controller Address Characteristic value represents a Bluetooth address of a remote controller that can control a pairing device.

When one remote controller has control authority, the Controller Address Characteristic has a Bluetooth address of one remote controller.

When a plurality of remote controllers have control authority, the Controller Address Characteristic has a Bluetooth address of a plurality of remote controllers.

Here, when a plurality of remote controllers have a Bluetooth address, the Controller Address Characteristic value may include priority information of control authority.

Next, a Number of Controllers Characteristic value is a value designating the number of remote controllers in which remote control is available.

That is, remote controllers corresponding to the number of remote controllers may perform a Bluetooth connection with a specific device.

When remote controllers exceeding the number of controllers request a Bluetooth connection, a pairing device blocks a connection with a remote controller that newly requests a Bluetooth connection regardless of the above control authority providing policy.

Next, a Main Controller Characteristic value represents setup of a main remote controller that can control a pairing device.

When an existing remote controller terminates a Bluetooth connection with a pairing device, a next remote controller may become a main controller according to connection order (contention method) or a priority.

Alternatively, even if an existing remote controller terminates a connection, a main controller characteristic value may be set such that the main controller does not change.

Alternatively, in a necessary case, another remote controller may become a main controller.

Table 5 represents an example of a Multi Control Type described in Table 4.

TABLE 5

| 7th bit | 6th bit | 5th bit | 4th bit | 3th bit | 2th bit | 1st bit | 0th bit |
|---|---|---|---|---|---|---|---|
| Reserved for Future Use | | | | Shared | Monopoly | Priority | Contention |

Referring to Table 5, a Characteristic value of a Multi Control Type may have a size of 8 bit, and when a third bit of the Multi Control Type is set to, for example, '1' (may be set to '0'), the third bit may represent the control of a 'Shared' method, when a second bit is set to '1' (may be set to '0'), the second bit may represent the control of a 'Monopoly' method, when a first bit is set to '1' (may be set to '0'), the first bit may represent the control of a 'Priority' method, and when a 0th bit is set to '1' (may be set to '0'), the 0th bit may represent the control of a 'Contention' method.

A control authority method according to the multi control type will be described in detail with reference to FIGS. 14 to 16 to be described later.

Hereinafter, a control authority return method will be described.

When the magic remote control, having received control authority from the TV does not perform a remote control operation for a predetermined time or no longer requires control authority thereof, the magic remote control returns control authority acquired from the TV.

Specifically, the magic remote control transmits a control authority return message notifying that the magic remote control returns control authority to the TV.

Thereafter, the TV may transmit an OK message that confirms control authority return or a reject message that does not confirm control authority return to the magic remote control.

Here, a case of transmitting the reject message may include, for example, a case in which the magic remote control erroneously transmits the control authority return message.

Hereinafter, a control authority release procedure will be described.

This case represents a method of recovering control authority in which the TV forcibly gives to the magic remote control.

The control authority release procedure may be applied to a case in which a control authority providing policy is set to a priority.

Specifically, when the TV corresponding to a pairing device receives a control authority request from another magic remote control in which a priority of control authority is highly set, the TV transmits a control authority release message notifying control authority release to the magic remote control having control authority through Bluetooth communication.

Because the above procedure related to a control authority request, control authority return, and control authority release is an operation after a Bluetooth connection, transmission and reception of a message related to the control authority request, a message related to the control authority return, and a message related to the control authority release is performed through Bluetooth communication.

Thereafter, the magic remote control, having received the control authority release message may transmit an OK message that confirms control authority release or a reject message representing rejection of the control authority release to the TV.

A case of transmitting the reject message may include, for example, a case in which the TV erroneously determines a priority of control authority and transmits the control authority release message because a control authority providing policy set to the TV, particularly, a control authority priority is not managed or updated.

Therefore, when transmitting a control authority release message, the TV may include priority information of control authority of another magic remote control that newly requests control authority.

Here, in a situation in which a plurality of magic remote controls are connected to one TV, as described above, when the plurality of magic remote controls receive a control authority release message from the TV and when a specific magic remote control monopolizes control authority, a problem on whether to maintain a Bluetooth connection between the remaining magic remote controls having no control authority and the TV may occur.

In this case, it is necessary that the remaining magic remote controls having no the control authority transmit and receive a message to and from the TV, and when the remaining magic remote controls request again control authority, for a fast connection, it may be preferable that the remaining magic remote controls do not terminate a Bluetooth connection with the TV but maintain a connection.

For example, in BLE, it may be necessary that the magic remote control having no control authority regularly transmits a meaningless message.

Further, in BR/EDR, devices connected by Bluetooth exchange meaningless messages, and the devices should send and receive a message without user interaction.

In the magic remote control having no control authority, when data related to control authority occur by a user's receiving input, (1) the magic remote control may not transmit a corresponding message through filtering or (2) the TV may ignore reception of a packet related to the magic remote control having no control authority.

For another example, in a situation in which one the magic remote control and one TV have a single connection, when a control authority release message is received from the TV, it may be preferable that the magic remote control terminates a Bluetooth connection with the TV.

In a method in which the magic remote control terminates a Bluetooth connection with the TV, as the TV transmits a connection termination message to the magic remote control or as the magic remote control transmits a connection termination message to the TV, a Bluetooth connection may be terminated.

Next, a method of setting a control authority providing policy will be described.

As described above, a control authority providing policy may include a contention method type, a priority method type, and a control support type of several devices.

Specifically, the magic remote control transmits a control method set message for setting a control method of the TV to the TV.

The control method set message may include contention representing acquirement of control authority through contention, a priority representing acquirement of control authority according to a priority, and a multiple value representing sharing of control authority in a plurality of magic remote controls.

Thereafter, the TV determines whether control method setup in which the magic remote control requests corresponds to a control authority providing policy and transmits a determination result, i.e., a request result (confirmation or rejection) of control method setup to the magic remote control.

That is, when the request result of the control method setup is confirmation, the TV transmits an OK message to the magic remote control, and when the request result of the control method setup is rejection, the TV transmits a reject message to the magic remote control.

Further, when the magic remote control receives a selection input to various point icons from a user, the magic remote control transmits a pointer icon set message to the TV.

Thereafter, the TV transmits a result (confirmation or rejection) on whether to perform a pointer icon set by the magic remote control to the magic remote control.

Figure 14:
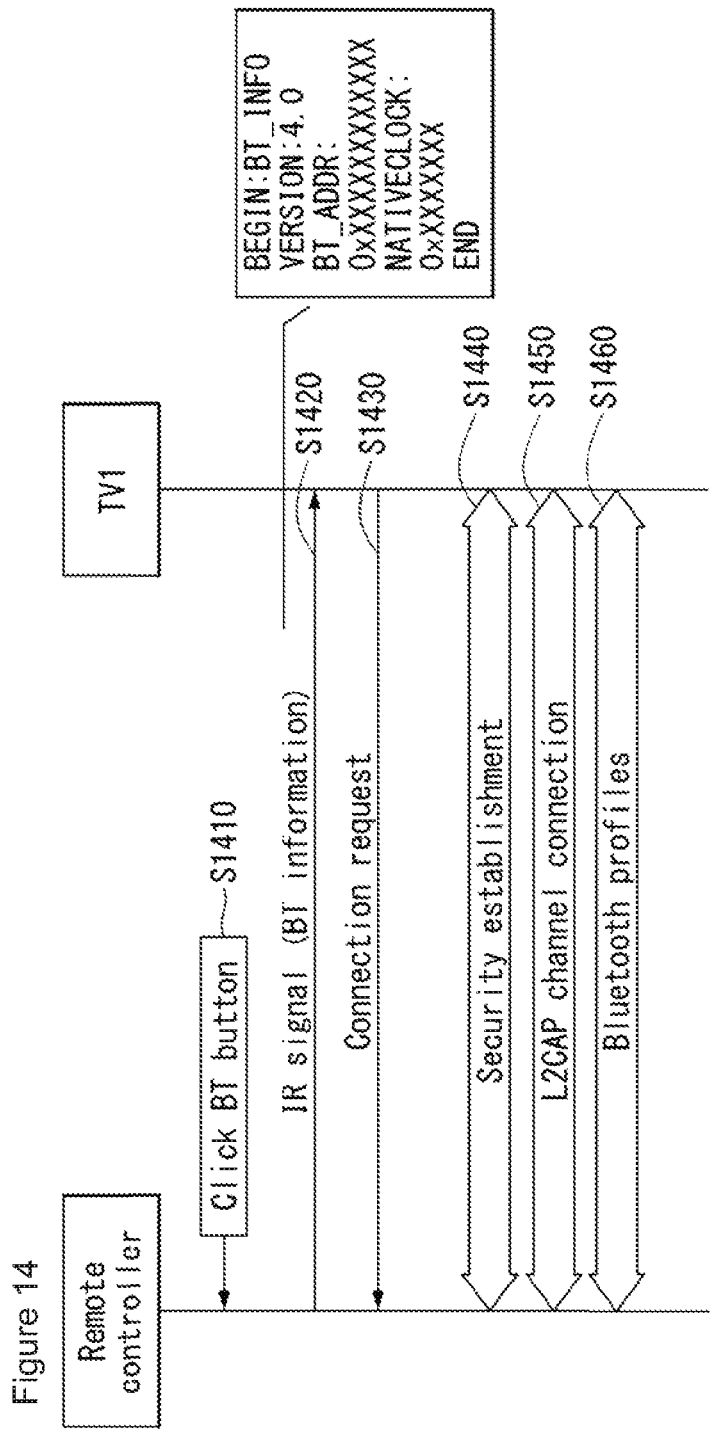
FIG. 14 is a flowchart illustrating another example of a Bluetooth connection method using infrared rays suggesting in this specification.

FIG. 14 is a flowchart illustrating another example of a Bluetooth connection method using infrared rays suggesting in this specification.

FIG. 14 illustrates a method of forming a Bluetooth connection, i.e., Bluetooth pairing using an IR signal and BLE technology.

Steps S1410, S1420, and S1440 to S1460 are the same as steps S610, S620, and S650 to S670 of FIG. 6 and therefore a detailed description thereof is omitted, and only dissimilar constituent elements are described here in detail.

After step S1420, i.e., after receiving an IR signal including Bluetooth connection information from the magic remote control, the TV transmits a connection request message to the magic remote control (S1430).

The connection request message may include Bluetooth type information representing a supporting Bluetooth technology type, Bluetooth address information representing a Bluetooth address of the TV, and target device Bluetooth address information representing a Bluetooth address of a target device, i.e., a magic remote control.

The Bluetooth type information may include a type 1 representing the support of BLE, a type 2 representing the support of BR/EDR, and a type 3 representing the support of both BLE and BR/EDR.

The connection request message may be represented with a connection request packet, a connection request PDU, a connection request channel PDU, and a connection request signal.

The connection request message may include an InitA field representing an address of an initiator that initiates a connection request, an AdvA field representing an address of an advertiser, and a link layer data field including link layer data LLData.

Bluetooth address information of the TV included in the connection request message transmitted at step S1430 may use an InitA field of the connection request message, and an address of the magic remote control may use an AdvA field of the connection request message.

Figure 15:
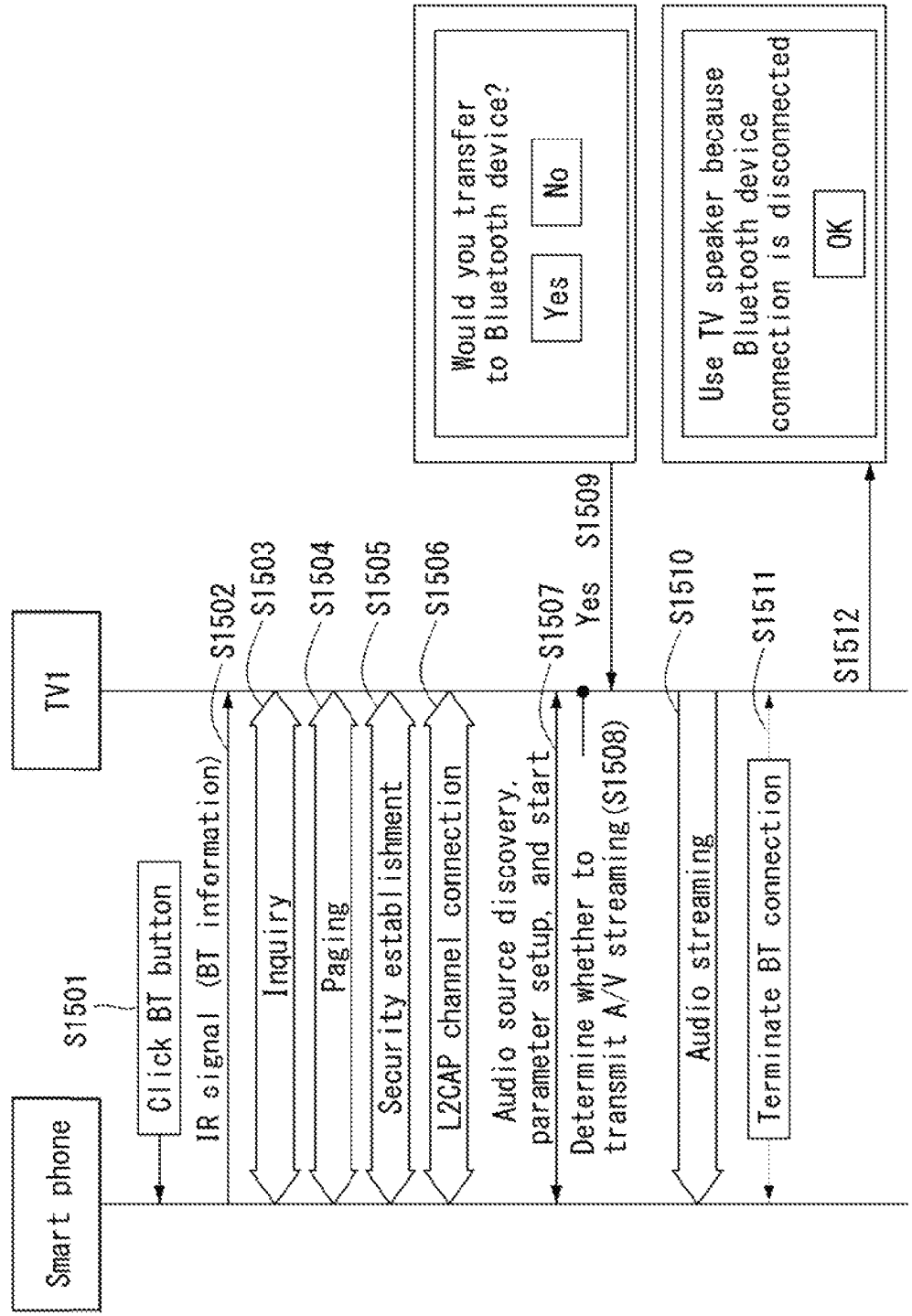
FIG. 15 is a flowchart illustrating an example of a method of transmitting audio/video stream using the method of FIG. 6.

FIG. 15 is a flowchart illustrating an example of a method of transmitting audio/video stream using the method of FIG. 6.

Steps S1501 to S1506 are the same as steps S610 to S660 of FIG. 6 and therefore a detailed description thereof is omitted, and only dissimilar constituent elements are described here in detail.

In a case of FIG. 15, a device that performs a function of a remote controller is a terminal having a function of the magic remote control.

After step S1506, the terminal and the TV perform a connection procedure for transmitting A/V using a Bluetooth audio/video (AN) protocol and profile (S1507).

That is, in order to perform an A/V connection procedure, the terminal and the TV perform an audio source discovery procedure, a related set parameter procedure, and a start procedure.

After step S1507 is complete, the TV determines whether to transmit audio and/or video stream to the terminal (S1508).

Here, the TV may output an UI in which the user may determine whether to transmit the audio and/or video stream through the output unit (S1509).

When the TV receives a user input that instructs to transmit A/V stream to the terminal (S1509), the TV transmits currently outputting A/V stream to the terminal (S1510).

After a predetermined time, when a Bluetooth connection between the terminal and the TV is terminated by a request of the terminal or a request of the TV (S1511), the TV outputs an UI that again outputs A/V streaming that is output through the terminal through the TV through the output unit (S1512).

Figure 16:
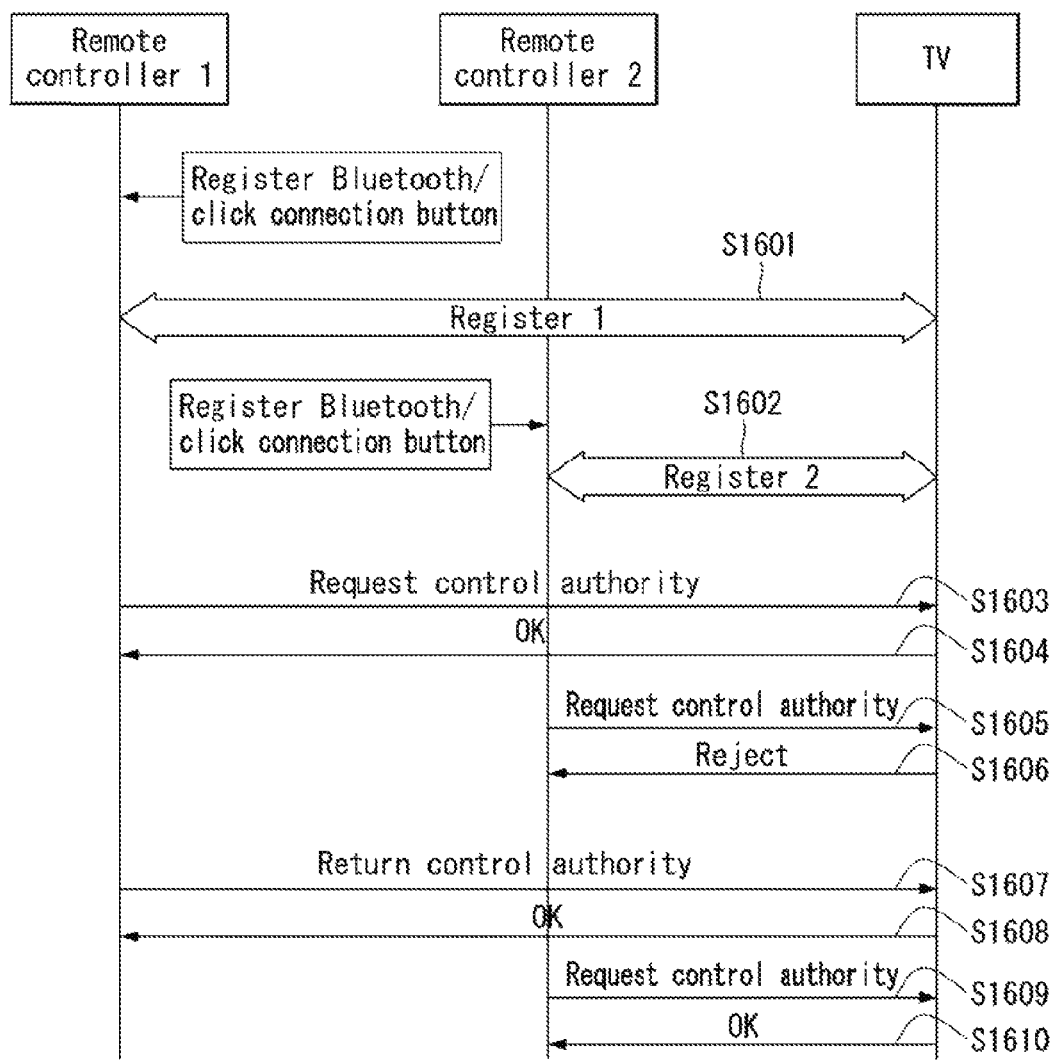
FIG. 16 is a flowchart illustrating an example of a method of acquiring control authority through a contention method suggesting in this specification.

FIG. 16 is a flowchart illustrating an example of a method of acquiring control authority through a contention method suggesting in this specification.

As shown in FIG. 16, a magic remote control 1 performs a Bluetooth connection with a TV using a BT button (S1601).

Thereby, the magic remote control 1 is registered at the TV.

Thereafter, a magic remote control 2 performs a Bluetooth connection with the TV using a BT button thereof (S1602).

Thereby, the magic remote control 2 is registered at the TV.

Thereafter, the magic remote control 1 transmits a control authority request message to the TV (S1603).

Thereafter, the TV transmits an OK message that confirms the control authority request to the magic remote control 1, having transmitted the control authority request (S1604).

Thereafter, the magic remote control 2 transmits the control authority request message to the TV (S1605).

Thereafter, because a contention method of control authority providing policy is set, the TV transmits a reject message that rejects the control authority request to the magic remote control 2, having transmitted the control authority request later than the magic remote control 1 (S1606).

After a predetermined time, the magic remote control 1 transmits a control authority return message for returning control authority to the TV (S1607).

Thereafter, the TV transmits an OK message that confirms a control authority return request of the magic remote control 1 to the magic remote control 1 (S1608).

Thereafter, when the magic remote control 2 transmits again a control authority request message to the TV (S1609), the TV transmits an OK message that confirms the control authority request of the magic remote control 2 to the magic remote control 2 (S1610).

Figure 17:
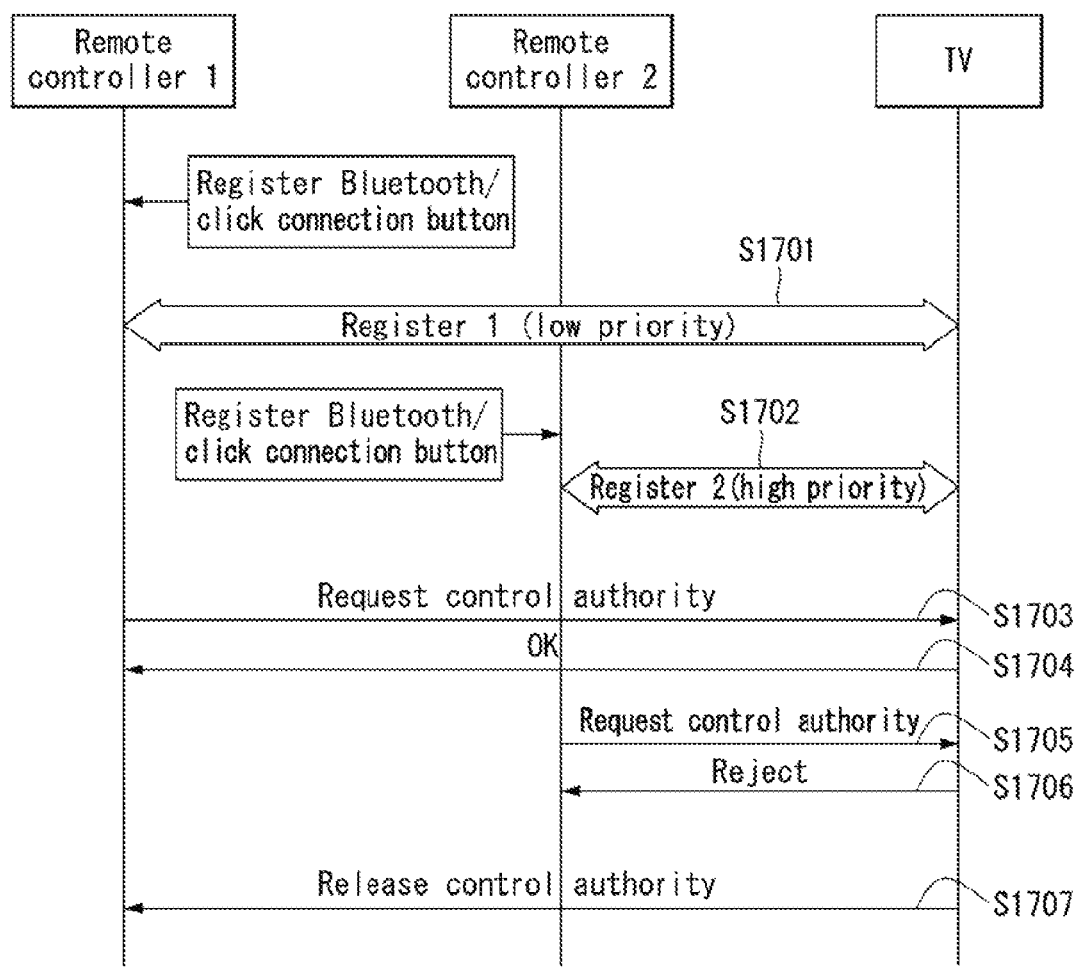
FIG. 17 is a flowchart illustrating an example of a method of acquiring control authority through a priority method suggesting in this specification.

FIG. 17 is a flowchart illustrating an example of a method of acquiring control authority through a priority method suggesting in this specification.

As shown in FIG. 17, the magic remote control 1 has a priority lower in control authority than that of the magic remote control 2.

The magic remote control 1 performs a Bluetooth connection with the TV (S1701). At step S1701, control authority priority information of the magic remote control may be exchanged.

Therefore, the TV may know that control authority of the magic remote control has a relatively low priority through step S1701.

Thereafter, the magic remote control 2 performs a Bluetooth connection with the TV (S1702).

Similarly, priority information of control authority of the magic remote control 2 may be exchanged through step S1702.

At steps S1701 and S1702, each magic remote control uses a BT button for a Bluetooth connection with the TV.

Thereafter, the magic remote control 1 transmits a control authority request message for requesting control authority to the TV (S1703).

Thereafter, the TV transmits an OK message that confirms the control authority request of the magic remote control 1 to the magic remote control 1 (S1704).

Thereafter, the magic remote control 2 having a priority higher in control authority than that of the magic remote control 1 transmits a control authority request message for requesting control authority to the TV (S1705).

Thereafter, the TV transmits an OK message that confirms a control authority request of the magic remote control 2 to the magic remote control 2 according to a control authority providing policy according to a priority (S1706).

The TV transmits a control authority release message notifying release of provided control authority to the magic remote control 1 (S1707).

Control authority release of the magic remote control 1 through the control authority release message may be unilaterally performed by the TV.

Figure 18:
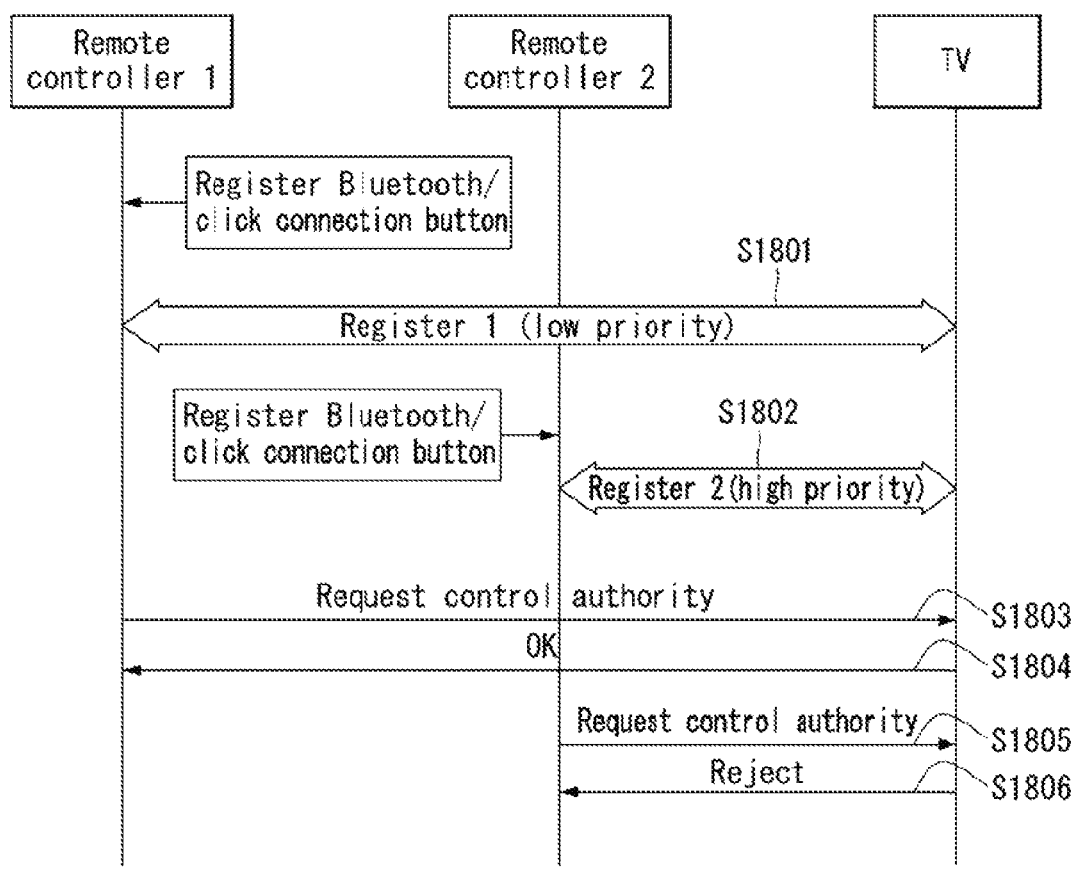
FIG. 18 is a flowchart illustrating an example of a method of sharing control authority through a support method of a plurality of remote controllers suggesting in this specification.

FIG. 18 is a flowchart illustrating an example of a method of sharing control authority through a support method of a plurality of remote controllers suggesting in this specification.

Referring to FIG. 18, the magic remote control 1 and the magic remote control 2 each perform a Bluetooth connection with the TV using a BT button (S1801-S1802).

The magic remote control 1 may have a priority lower in control authority than that of the magic remote control 2.

Thereafter, the magic remote control 1 transmits a control authority request message for requesting control authority to the TV (S1803), and the TV transmits an OK message for confirming the control authority request of the magic remote control 1 to the magic remote control 1 (S1804).

Thereafter, the magic remote control 2 transmits a control authority request message for requesting control authority to the TV (S1805), and the TV transmits an OK message for confirming the control authority request of the magic remote control 2 to the magic remote control 2 according to a control authority providing policy (set with a plurality of device support methods) (S1806).

Thereby, the magic remote control 1 and the magic remote control 2 may share control authority of the TV.

Figure 19:
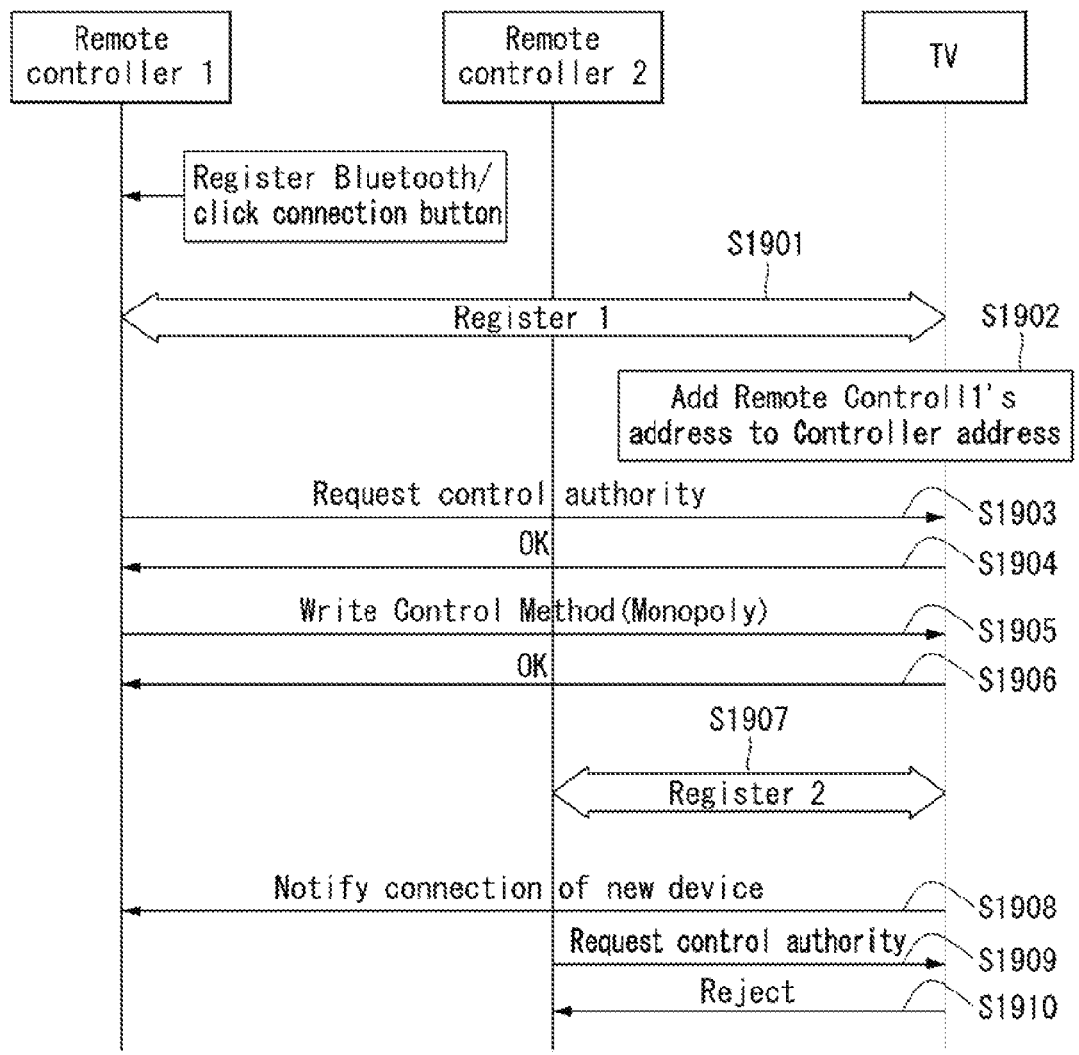
FIG. 19 is a flowchart illustrating an example of a method of setting control authority according to a multi control type suggesting in this specification.

FIG. 19 is a flowchart illustrating an example of a method of setting control authority according to a multi control type suggesting in this specification.

FIG. 19 illustrates a method of acquiring control authority when a multi control type is set to a 'monopoly method'.

First, the magic remote control 1 performs a Bluetooth connection with the TV using a BT button (S1901).

Thereafter, the TV adds a Bluetooth address of the magic remote control 1 using an IR signal transmitted from the magic remote control 1 through step S1901 (S1902).

The reason why the TV registers a Bluetooth address of the magic remote control is that when the Bluetooth address of the magic remote control is registered, the TV may be controlled through the magic remote control.

A Bluetooth address addition procedure of the magic remote control may be performed using a directed connectable advertising and scanning filter policy.

Thereafter, the magic remote control 1 transmits a control authority request message for requesting control authority to the TV (S1903), and the TV transmits an OK message that confirms the control authority request of the magic remote control 1 to the magic remote control 1 (S1904).

Thereafter, in order to monopolize control authority, the magic remote control 1 transmits a write control method in which a Multi Control Type is set to a 'monopoly method' to the TV (S1905).

Thereafter, the TV transmits an OK message for confirming a request of the magic remote control transmitted at step S1905 to the magic remote control 1 (S1906).

The magic remote control 1 may monopolize control authority through step S1906.

Thereafter, the magic remote control 2 performs a Bluetooth connection with the TV (S1907).

Thereafter, the TV transmits instruction information notifying that a Bluetooth connection of a new magic remote control exists to the magic remote control 1 (S1908).

Thereafter, when the magic remote control 2 requests control authority to the TV (S1909), control authority is monopolized by the magic remote control 1 and thus the TV transmits a reject message that rejects the control authority request to the magic remote control 2 (S1910).

The reject message may include rejection reason information (e.g., excess of the number of connected magic remote controls and monopolistic control setup) of the control authority request to the magic remote control 2.

However, when the magic remote control 1 allows a connection of a new magic remote control, control authority of the TV may be changed from the magic remote control 1 to the magic remote control 2.

Figure 20:
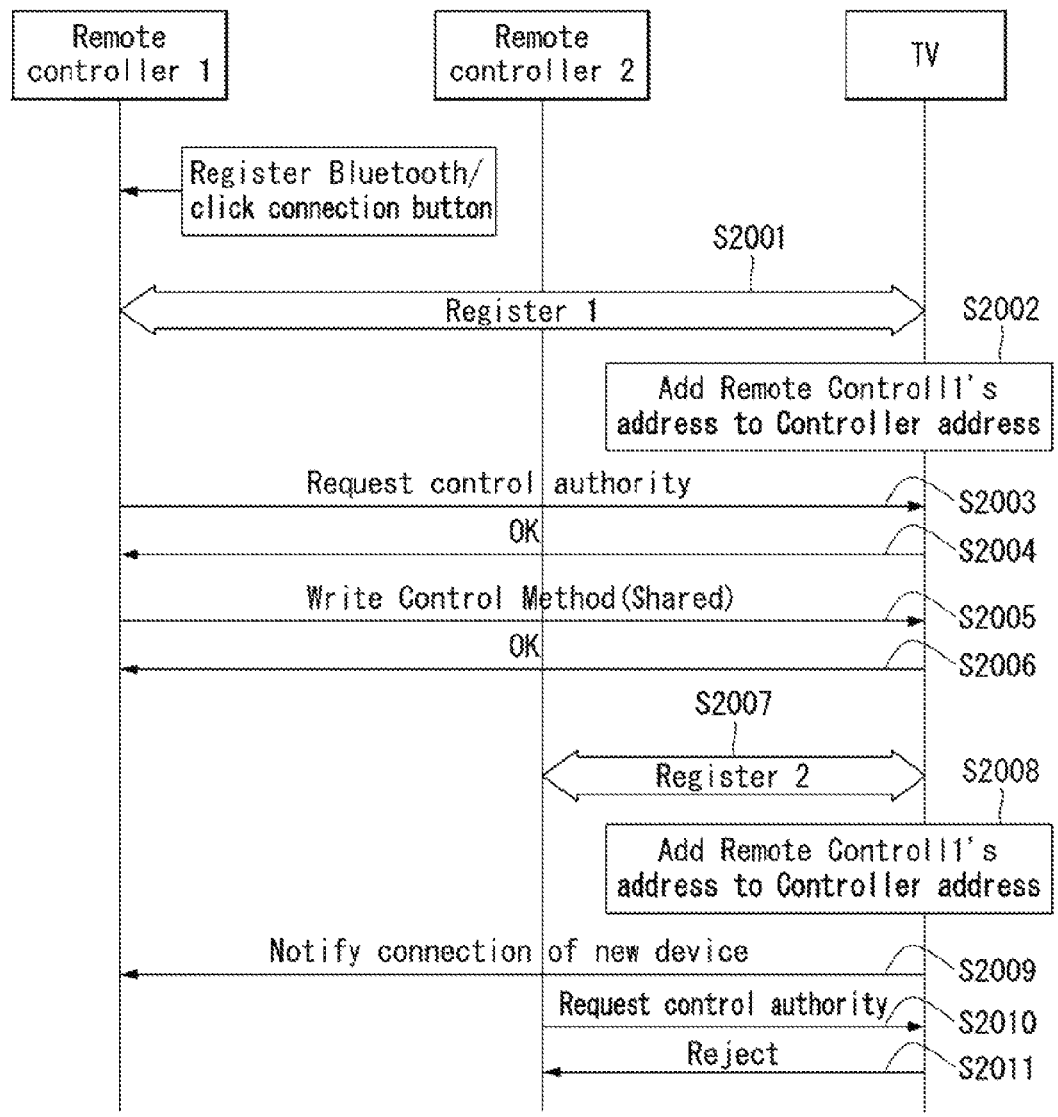
FIG. 20 is a flowchart illustrating another example of a method of setting control authority according to a multi control type suggesting in this specification.

FIG. 20 is a flowchart illustrating another example of a method of setting control authority according to a multi control type suggesting in this specification.

Steps S2001 to S2004, S2007, S2009, and S2010 are the same as steps S1901 to S1904 and S1908 to S1909 of FIG. 19 and therefore a detailed description thereof is omitted, and only dissimilar constituent elements are described here in detail.

That is, FIG. 20 illustrates a method of acquiring control authority of a case in which a Multi Control Type is set to a 'Shared method '.

After step S2004, the magic remote control transmits a request for a control method in which a Multi Control Type is set to a 'Shared method' to the TV (S2005).

Thereafter, in order to confirm a control authority request of the magic remote control 1, the TV transmits an OK message to the magic remote control 1 (S2006).

The TV adds an address of the magic remote control 2 through step S2007, i.e., a Bluetooth connection procedure between the magic remote control 2 and the TV (S2008).

The TV transmits an OK message for confirming a control authority request of the magic remote control 2 to the magic remote control 2 (S2011).

Thereby, the magic remote control 1 and the magic remote control 2 each share control authority of the TV.

Figure 21:
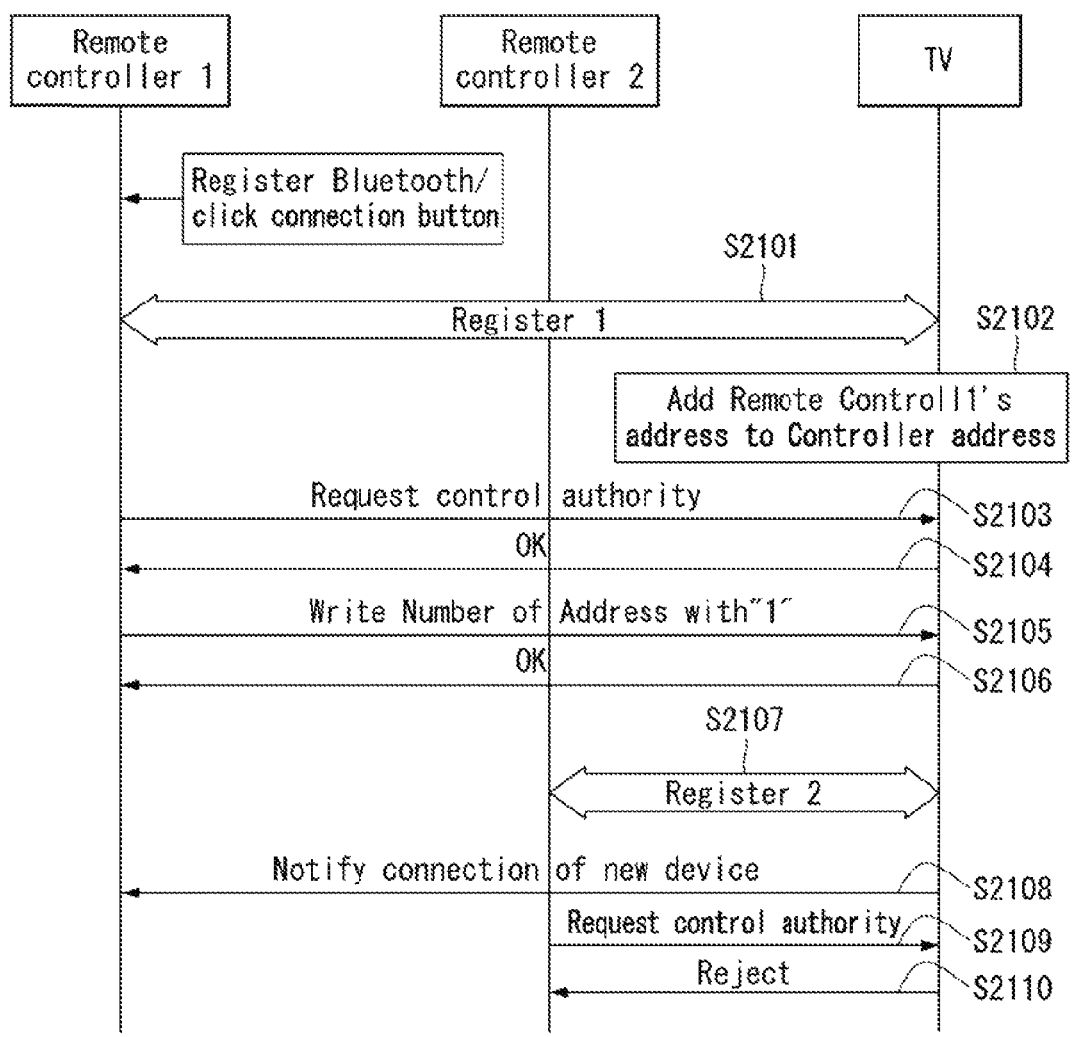
FIG. 21 is a flowchart illustrating another example of a method of setting control authority according to a multi control type suggesting in this specification.

FIG. 21 is a flowchart illustrating another example of a method of setting control authority according to a multi control type suggesting in this specification.

Steps S2101 to S2104 and S2107 to S2110 are the same as steps S1901 to S1904 and S1907 to S1910 of FIG. 19 and therefore a detailed description thereof is omitted, and only dissimilar constituent elements are described here in detail.

FIG. 21 illustrates a method of acquiring control authority when number information of controllers, i.e., the number of magic remote controls that may be registered at a TV is set.

The magic remote control 1 transmits Write Number of Controllers in which the controller number is set to 1 to the TV (S2105), and the TV transmits an OK message that confirms a request for Write Number of Controllers of the magic remote control 1 to the magic remote control (S2106).

That is, when setting and defining the number of controllers with a method of setting control authority, the address number of magic remote controls that may be registered at the TV may be limited to a value set at number of controllers.

Therefore, when the number of magic remote controls that request control authority is larger than a value set to the number of controllers, the TV rejects newly requested control authority regardless of a control authority providing policy.

Therefore, when the magic remote control 2 transmits a control authority request message to the TV, the TV transmits a reject message notifying rejection of the control authority request to the magic remote control 2 due to excess of the controller number (the address number of magic remote controls that may be registered is set to '1') (S2110).

Further, the reject message may include information related to a rejection reason and may be, for example, excess of the controller number.

Further, for convenience of description, exemplary embodiments are described with reference to each drawing, but exemplary embodiments described with reference to each drawing may be combined to implement a new exemplary embodiment. According to necessity of a person of ordinary skill in the art, a computer readable recording medium on which a program for executing the foregoing exemplary embodiments is recorded belongs to the scope of the present invention.

A method of performing a Bluetooth connection according to this specification is not limited to a configuration and method of exemplary embodiments, and for various changes of the exemplary embodiments, the entire or a portion of exemplary embodiments may be selectively combined.

A method of performing a Bluetooth connection according to this specification may be implemented as a processor readable code in a processor readable recording medium provided in a network device. The processor readable recording medium includes an entire kind of record device that stores data that may be read by a processor. The processor readable recording medium may include, for example, a ROM, a RAM, a CD-ROM, a magnetic tape, a floppy disk, and an optical data storage device and may further include implementation of a carrier wave form such as transmission through Internet. Further, in the processor readable recording medium, codes that are distributed in a computer system connected to a network and in which a processor may read with a distributed method may be stored and executed.

Further, in the foregoing description, an exemplary embodiment of the present invention has been described, but the present invention is not limited to the foregoing specific exemplary embodiment and can be variously changed by a person of ordinary skill in the art without departing from the scope of the present invention claimed in the claims, and such a modified embodiment should not be individually understood from the spirit or scope of the present invention.

In this specification, both a product invention and a method invention are described, and a description of both inventions may be supplementarily described, as needed.

INDUSTRIAL APPLICABILITY

This specification uses a device-to-device connection, i.e., pairing in a wireless communication system.

The invention claimed is:

1. A method of performing a device-to-device connection in a wireless communication system, the method performed by a first device and comprising:
   transmitting a first communication signal comprising connection information for a second communication connection to at least one second device;
   receiving a response to the first communication signal from the at least one second device;
   performing the second communication connection with the second device based on the received response;
   transmitting a control authority request message for requesting control authority related to remote control to the second device; and
   receiving a response to the control authority request message from the second device,
   wherein the connection information comprises at least one of version information representing a second communication version of the first device, type information representing a second communication technology type supported by the first device, address information representing a second communication connection address of the first device, or synchronization information used for synchronization of the second communication connection.

2. The method of claim 1, further comprising transmitting a first message comprising control information related to control authority setup of a plurality of remote controllers to the second device.

3. The method of claim 2, wherein the control information comprises at least one of a multi control type field representing a control method of the plurality of remote controllers, a controller address field representing a second communication connection address of a remote controller that can control a pairing device, a controller number field designating a number of remote controllers in which pairing is available, or a main controller field representing a main remote controller that can control a pairing device.

4. The method of claim 3, wherein the multi control type field comprises at least one of a first type representing a method of acquiring control authority through contention, a second type representing a method of acquiring control authority according to a priority, a third type representing a method in which only one remote controller has control authority, or a fourth type representing a method in which a plurality of remote controllers share control authority.

5. The method of claim 1, wherein the performing of the second communication connection comprises:
   outputting a list including the at least one second device in which the second communication connection is available based on the response;
   receiving a selection input to a specific second device in the output list; and
   performing the second communication connection with the selected second device.

6. The method of claim 1, further comprising:
   transmitting a control authority return message for returning the control authority related to remote control to the second device; and
   receiving a response to the control authority return message from the second device,
   wherein the response to the control authority return message is confirmation or rejection of control authority return.

7. The method of claim 1, further comprising receiving a control authority release message notifying that the control authority related to remote control is released from the second device.

8. The method of claim 1, wherein the first communication signal is an infra-red (IR) code allocated on each device basis, and the IR code has a size of 1 to 2 byte.

9. The method of claim 1, wherein the first device comprises at least one of a first button for transmitting a second communication connection request signal, a second button for searching for devices in which the second communication connection is available, and a display unit for displaying a name of a device selected by the second button.

10. The method of claim 1, wherein the synchronization information comprises at least one of frequency hopping sequence information or native clock information representing time offset of a reference clock.

11. The method of claim 1, further comprising:

performing Audio/Video (A/V) setup with the second device; and receiving A/V stream from the second device.

12. The method of claim 1, wherein the response is a connection request message, and the response comprises second communication connection information related to the second device.

13. The method of claim 1, wherein the performing of the second communication connection comprises:

transmitting an inquiry message to the at least one second device; and receiving an Extended Inquiry Response (EIR) message corresponding to a response to the inquiry message from the at least one second device.

14. The method of claim 13, further comprising performing a paging procedure with the second device.

15. The method of claim 1, wherein the first device is a remote controller, and the second device is a Television (TV).

16. A first device that performs a device-to-device connection in a wireless communication system, the first device comprising:

a communication unit that transmits and receives a signal to and from the outside by wire and/or wireless; and a controller operably coupled to the communication unit, wherein the controller is configured to:

cause the communication unit to transmit a first communication signal comprising connection information for a second communication connection to at least one second device;

cause the communication unit to receive a response to the first communication signal from the at least one second device;

perform the second communication connection with the second device based on the received response;

cause the communication unit to transmit a control authority request message for requesting control authority related to remote control to the second device; and cause the communication unit to receive a response to the control authority request message from the second device, wherein the connection information comprises at least one of version information representing a second communication version of the first device, type information representing a second communication technology type supported by the first device, address information representing a second communication connection address of the first device, or synchronization information used for synchronization of the second communication connection.

* * * * *